United States Patent
Yang et al.

(10) Patent No.: US 12,260,874 B2
(45) Date of Patent: Mar. 25, 2025

(54) SPEECH DENOISING NETWORKS USING SPEECH AND NOISE MODELING

(71) Applicant: Samsung Electronics Co., Ltd., Suwon-si (KR)

(72) Inventors: Chou-Chang Yang, San Jose, CA (US); Ching-Hua Lee, Mountain View, CA (US); Rakshith Sharma Srinivasa, Sunnyvale, CA (US); Yashas Malur Saidutta, San Jose, CA (US); Yilin Shen, San Jose, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 18/058,104

(22) Filed: Nov. 22, 2022

(65) Prior Publication Data

US 2024/0046946 A1  Feb. 8, 2024

Related U.S. Application Data

(60) Provisional application No. 63/395,741, filed on Aug. 5, 2022.

(51) Int. Cl.
*G10L 21/0232* (2013.01)
*G10L 15/02* (2006.01)
(Continued)

(52) U.S. Cl.
CPC .......... *G10L 21/0232* (2013.01); *G10L 15/02* (2013.01); *G10L 15/063* (2013.01); *G10L 25/18* (2013.01); *G10L 2021/02166* (2013.01)

(58) Field of Classification Search
USPC ................................................... 704/1–504
See application file for complete search history.

(56) References Cited

U.S. PATENT DOCUMENTS

| | | | |
|---|---|---|---|
| 11,133,011 B2* | 9/2021 | Watanabe | G10L 15/20 |
| 11,257,512 B2* | 2/2022 | Nesta | G06N 3/08 |

(Continued)

FOREIGN PATENT DOCUMENTS

| | | |
|---|---|---|
| CN | 111429930 A | 7/2020 |
| CN | 114155852 A | 3/2022 |

(Continued)

OTHER PUBLICATIONS

International Search Report and Written Opinion of the International Searching Authority dated Oct. 13, 2023, in connection with International Application No. PCT/KR2023/009886, 11 pages.

*Primary Examiner* — Marcus T Riley

(57) ABSTRACT

A method includes obtaining, using at least one processing device, noisy speech signals and extracting, using the at least one processing device, acoustic features from the noisy speech signals. The method also includes receiving, using the at least one processing device, a predicted speech mask from a speech mask prediction model based on a first acoustic feature subset and receiving, using the at least one processing device, a predicted noise mask from a noise mask prediction model based on a second acoustic feature subset. The method further includes providing, using the at least one processing device, predicted speech features determined using the predicted speech mask and predicted noise features determined using the predicted noise mask to a filtering mask prediction model. In addition, the method includes generating, using the at least one processing device, a clean speech signal using a predicted filtering mask output by the filtering mask prediction model.

20 Claims, 13 Drawing Sheets

(51) Int. Cl.
*G10L 15/06* (2013.01)
*G10L 21/0216* (2013.01)
*G10L 25/18* (2013.01)

(56) References Cited

U.S. PATENT DOCUMENTS

| | | | |
|---|---|---|---|
| 11,380,307 B2* | 7/2022 | Xu | G10L 21/034 |
| 2011/0178800 A1* | 7/2011 | Watts | G10L 21/0208 |
| | | | 704/E15.039 |
| 2013/0030803 A1* | 1/2013 | Liao | H04R 3/005 |
| | | | 704/E15.001 |
| 2018/0366135 A1* | 12/2018 | Nakatani | G10L 21/0308 |
| 2019/0122689 A1* | 4/2019 | Jain | H04R 1/406 |
| 2019/0318755 A1* | 10/2019 | Tashev | G06N 3/045 |
| 2021/0074282 A1* | 3/2021 | Borgstrom | G10L 25/84 |
| 2021/0256988 A1* | 8/2021 | Gallart Mauri | G06N 3/04 |
| 2022/0291328 A1* | 9/2022 | Ozturk | G01S 5/06 |
| 2023/0090763 A1* | 3/2023 | Ozturk | H04W 4/027 |
| | | | 455/456.1 |
| 2024/0046946 A1* | 2/2024 | Yang | G10L 25/18 |

FOREIGN PATENT DOCUMENTS

| | | |
|---|---|---|
| WO | 2021/071489 A1 | 4/2021 |
| WO | 2022107393 A1 | 5/2022 |
| WO | 2022158913 A1 | 7/2022 |

\* cited by examiner

SPEECH DENOISING NETWORKS USING SPEECH AND NOISE MODELING

CROSS-REFERENCE TO RELATED APPLICATION AND PRIORITY CLAIM

This application claims priority under 35 U.S.C. § 119(e) to U.S. Provisional Patent Application No. 63/395,741 filed on Aug. 5, 2022, which is hereby incorporated by reference in its entirety.

TECHNICAL FIELD

This disclosure relates generally to machine learning systems. More specifically, this disclosure relates to speech denoising networks using speech and noise modeling.

BACKGROUND

Edge devices and mobile platforms often have relatively low computational resources due to low power consumption demands and very limited memory capacities. Hardware constraints (such as power consumption (battery), inference time (latency), etc.) are thus limiting factors for deploying deep learning models, which are typically too large for such devices and platforms. Many audio denoising units require a small footprint with less computational power to perform decent noise reduction. For example, some digital signal processing (DSP) chips allow only up to one megabyte of runtime memory for processing. Deep learning-based denoising techniques often require large neural networks to learn complicated mappings between noisy and clean signals, which can prohibit their deployment to such devices. When limiting the model size to be small enough for deployment purposes, the networks usually fail to achieve satisfactory performance.

SUMMARY

This disclosure relates to speech denoising networks using speech and noise modeling.

In a first embodiment, a method includes obtaining, using at least one processing device of an electronic device, noisy speech signals. The method also includes extracting, using the at least one processing device, acoustic features from the noisy speech signals. The method further includes receiving, using the at least one processing device, a predicted speech mask from a speech mask prediction model based on a first subset of the acoustic features. The method also includes receiving, using the at least one processing device, a predicted noise mask from a noise mask prediction model based on a second subset of the acoustic features. The method further includes providing, using the at least one processing device, predicted speech features determined using the predicted speech mask and predicted noise features determined using the predicted noise mask to a filtering mask prediction model. In addition, the method includes generating, using the at least one processing device, a clean speech signal using a predicted filtering mask output by the filtering mask prediction model.

In a second embodiment, an apparatus includes at least one processing device configured to obtain noisy speech signals. The at least one processing device is also configured to extract acoustic features from the noisy speech signals. The at least one processing device is further configured to receive a predicted speech mask from a speech mask prediction model based on a first subset of the acoustic features. The at least one processing device is also configured to receive a predicted noise mask from a noise mask prediction model based on a second subset of the acoustic features. The at least one processing device is further configured to provide predicted speech features determined using the predicted speech mask and predicted noise features determined using the predicted noise mask to a filtering mask prediction model. In addition, the at least one processing device is configured to generate a clean speech signal using a predicted filtering mask output by the filtering mask prediction model.

In a third embodiment, a non-transitory computer readable medium contains instructions that when executed cause at least one processor to obtain noisy speech signals. The non-transitory computer readable medium also contains instructions that when executed cause the at least one processor to extract acoustic features from the noisy speech signals. The non-transitory computer readable medium further contains instructions that when executed cause the at least one processor to receive a predicted speech mask from a speech mask prediction model based on a first subset of the acoustic features. The non-transitory computer readable medium also contains instructions that when executed cause the at least one processor to receive a predicted noise mask from a noise mask prediction model based on a second subset of the acoustic features. The non-transitory computer readable medium further contains instructions that when executed cause the at least one processor to provide predicted speech features determined using the predicted speech mask and predicted noise features determined using the predicted noise mask to a filtering mask prediction model. In addition, the non-transitory computer readable medium contains instructions that when executed cause the at least one processor to generate a clean speech signal using a predicted filtering mask output by the filtering mask prediction model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
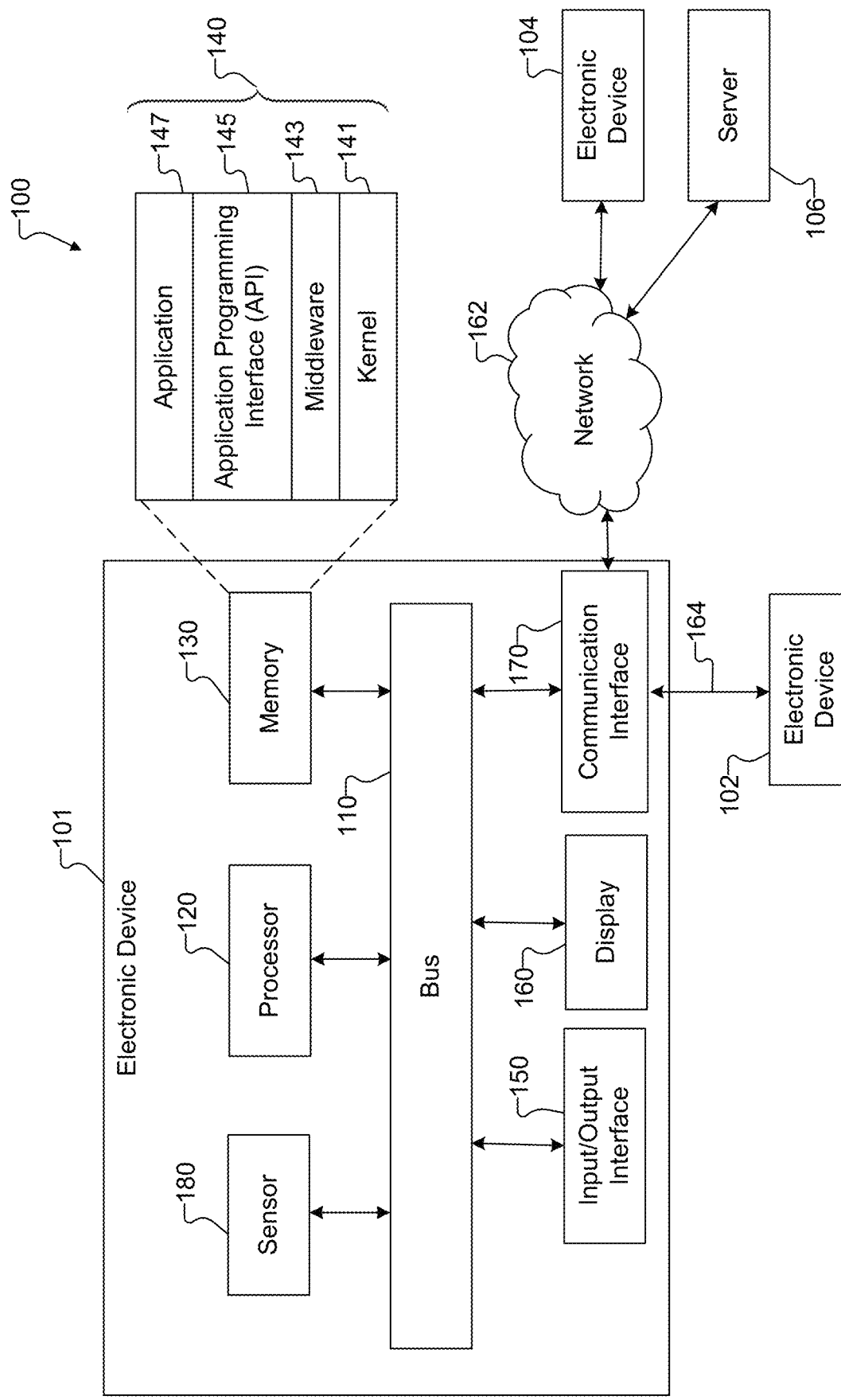
FIG. 1 illustrates an example network configuration including an electronic device in accordance with embodiments of this disclosure.

FIGS. 1 through 11, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, edge devices and mobile platforms often have relatively low computational resources due to low power consumption demands and very limited memory capacities. Hardware constraints (such as power consumption (battery), inference time (latency), etc.) are thus limiting factors for deploying deep learning models, which are typically too large for such devices and platforms. Many audio denoising units require a small footprint with less computational power to perform decent noise reduction. For example, some digital signal processing (DSP) chips allow only up to one megabyte of runtime memory for processing. Deep learning-based denoising techniques often require large neural networks to learn complicated mappings between noisy and clean signals, which can prohibit their deployment to such devices. When limiting the model size to be small enough for deployment purposes, the networks usually fail to achieve satisfactory performance.

Currently, there are two major existing pre-processing solutions that are widely used. However, both approaches still have not fully solved the denoising problem in noisy environments under limited resource constraints. First, some signal processing/hybrid signal processing-based solutions use beamforming techniques with signal processing-based noise suppression algorithms, where signal and noise properties are mathematically modeled to approach the solution. Although this type of noise suppression approach is applicable for use with resource-constrained computation devices such as DSP chipsets, it usually leads to sub-optimal performance as it is not capable of handling complicated real-world audio properties. Also, the signal processing-based approaches often require some manual tuning of some or all of its hyperparameters, which in turn makes the solution difficult to scale up for various applications and use cases and resulting in tedious parameter tuning for different setups and scenarios. Additionally, some deep learning-based data driven solutions use techniques to train speech denoising models in an end-to-end manner, which typically requires a large modeling capacity of the network model for appropriately learning noisy-to-clean signal mapping from the data. However, such networks are not suitable for deployment on memory/power constrained devices as they would require substantial central processing unit (CPU) or graphics processing unit (GPU) usage. Moreover, straightforward model size reduction is not possible because small networks struggle to learn such complicated noisy-to-clean signal mappings without special designs. Therefore, although existing signal processing and hybrid signal processing solutions can be applied on resource-constrained devices, they are typically not as powerful as deep learning-based approaches. Also, while deep learning-based approaches may have better denoising audio capabilities, they are difficult to deploy to resource-constrained devices.

It is also possible to use a cloud-based artificial intelligence (AI) approach for deep learning preprocessing by streaming raw audio data to the cloud. However, this can lead to user privacy concerns since all private audio data is streaming to the cloud for further processing. Moreover, this approach can introduce high latency and high power consumption and can require high bandwidth due to heavy dependence on Internet communications for processing. These disadvantages can make the system impractical to enable always-on services for continuous processing tasks, such as denoising procedures.

Embodiments of this disclosure address these or other problems by efficiently designing a model architecture and a learning strategy to take advantage of prior knowledge of signal and noise characteristics to provide the benefits of performing accurate denoising with a small network. Speech denoising and/or speech enhancement models of this disclosure can form a key component to enable various audio applications. Systems that do not include speech denoising and/or speech enhancement models are disadvantageous because received audio inputs will be supplied to speech processing systems, such as automated speech recognition (ASR) and wake-up services, with contaminated and noisy audio, reducing the accuracy of the speech processing systems. Therefore, embodiments of this disclosure include one or more speech denoising and/or speech enhancement models acting as an audio pre-processing front-end to reduce or remove various environmental noises contaminating the audio so that subsequent speech processing systems, such as ASR and wake-up services, can still work properly with minimal or no performance degradation. In some cases, the pre-processing model(s) can use an always-on listening property to process all incoming audio streams and can be executed in very low power computation and limited memory devices and platforms where minimal resource consumption is desired.

Some embodiments of this disclosure include, as the pre-processing model/architecture, a tiny machine learning ("tinyML") model. This model be applied to resource-constrained devices and can leverage deep learning-based data driven neural network approaches to provide better denoising performance. The tinyML model of embodiments of this disclosure includes a two-branch architecture having a speech prediction model and a noise prediction model configured to learn intermediate variables for characterizing speech and noise properties, respectively. Also, the tinyML model improves learning of a final signal-to-noise ratio (SNR)-dependent denoising filtering mask using a speech filtration model that predicts a clean speech signal for subsequent use by one or more speech processing systems, such as ASR and wake-up systems. In some embodiments, the tinyML model can use a multi-channel or multi-microphone approach to model both speech and noise separately by leveraging two subsets of microphones. Additionally, the tinyML model can be progressively trained, where the speech and noise prediction models are trained in a first training phase and final stages of the model (such as speech filtration and clean speech predictions) are trained in a second training phase.

The audio pre-processing models of this disclosure allow for running always-on, small-footprint, machine learning pre-processing services on edge devices (such as smartphones, smart glasses, augmented reality glasses, smartwatches, smart refrigerators, headphones or earbuds, robot vacuums, or other electronic devices described in this disclosure). Among other things, this provides advantages such as improved privacy, low latency, and low bandwidth since, in some embodiments, the pre-processing denoising system can run on-device and raw audio data is not sent to a cloud server. Lower power consumption can also be achieved since the small footprint tiny-machine processes consume very little power, enabling the processes to run for always-on tasks without high consumption of device power.

FIG. 1 illustrates an example network configuration 100 including an electronic device in accordance with embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may receive and process inputs (such as audio inputs or data received from an audio input device like a microphone), perform audio denoising, output a cleaned/denoised audio signal, and perform one or more ASR tasks or other tasks using the cleaned/denoised audio signal. The processor 120 may also instruct one or more other devices to perform one or more operations (such as outputting audio using an audio output device like a speaker) or display content on one or more displays 160. The processor 120 may further receive inputs (such as data samples to be used in training machine learning models) and manage such training by inputting the samples to the machine learning models, receiving outputs from the machine learning models, and executing learning functions (such as loss functions) to improve the machine learning models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting the receipt of audio data or signals; predicting speech masks, noise masks, and filtering masks using the audio data or signals to clean/denoise the audio data or signals; recognizing wake words in utterances included in the audio data or signals; performing speech recognition on the utterances; and executing tasks related to the content of the utterances. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may receive and process inputs (such as audio inputs or data received from an audio input device like a microphone), perform audio denoising, output a cleaned/denoised audio signal, and perform one or more ASR tasks or other tasks using the cleaned/denoised audio signal. The server 106 may also instruct one or more other devices to perform one or more operations (such as outputting audio using an audio output device like a speaker) or display content on one or more displays 160. The server 106 may further receive inputs (such as data samples to be used in training machine learning models) and manage such training by inputting the samples to the machine learning models, receiving outputs from the machine learning models, and executing learning functions (such as loss functions) to improve the machine learning models.

Although FIG. 1 illustrates one example of a network configuration 100 including an electronic device 101, various changes may be made to FIG. 1. For example, the network configuration 100 could include any suitable number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
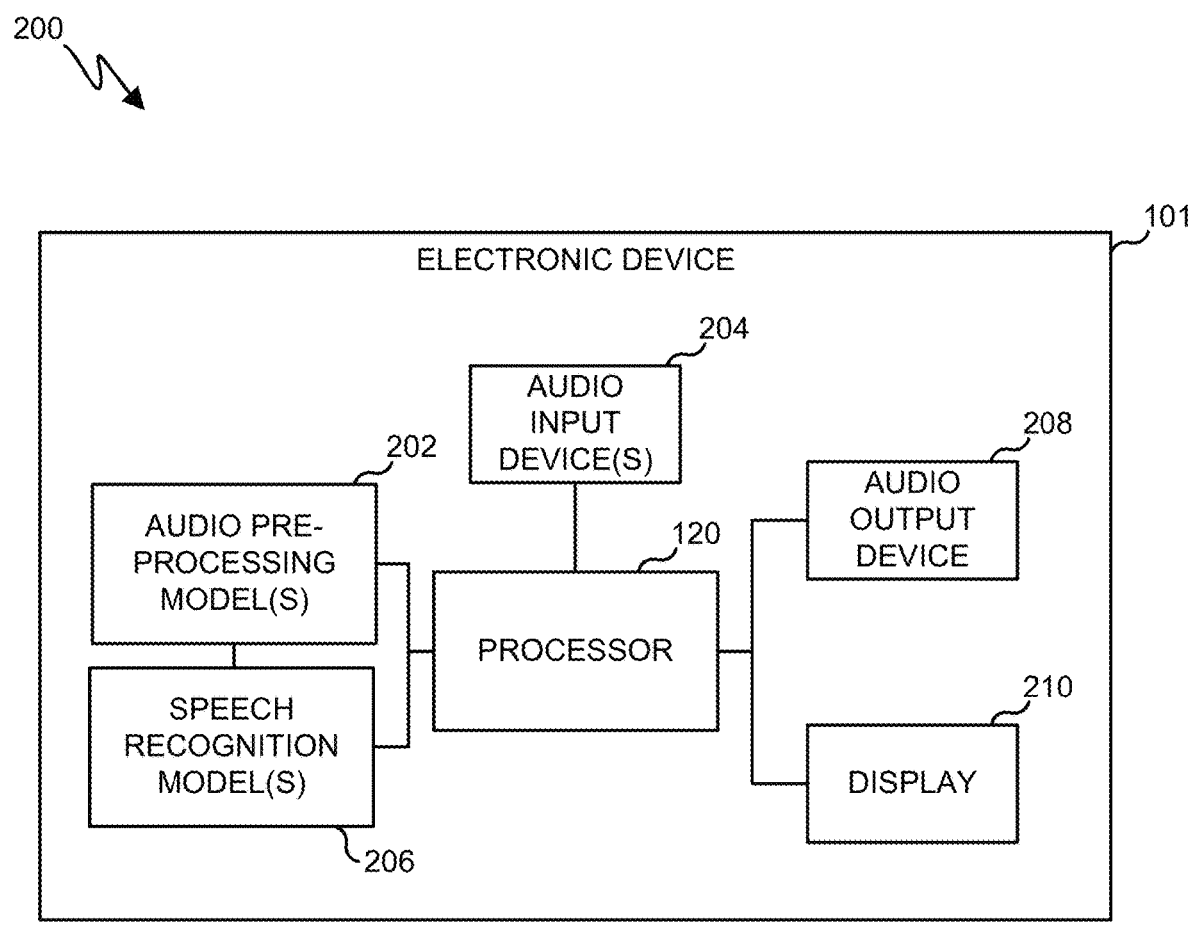
FIG. 2 illustrates an example audio denoising system in accordance with embodiments of this disclosure.

FIG. 2 illustrates an example audio denoising system 200 in accordance with embodiments of this disclosure. For ease of explanation, the system 200 is described as involving the use of the electronic device 101 in the network configuration 100 of FIG. 1. However, the system 200 may be used with any other suitable electronic device(s), such as the server 106, and in any other suitable system(s).

As shown in FIG. 2, the system 200 includes the electronic device 101, which includes the processor 120. The processor 120 is operatively coupled to or otherwise configured to use one or more machine learning models, such as one or more audio pre-processing models 202 to process audio data or signals received from at least one audio input device 204 (like a microphone). As described in this disclosure, the audio pre-processing model(s) 202 can include a tiny machine learning ("tinyML") model architecture, which can be applied to resource-constrained devices and can leverage deep learning-based data-driven neural network approaches to provide better denoising performance. The audio pre-processing model(s) 202 of embodiments this disclosure can include a two-branch architecture, including a speech prediction model and a noise prediction model configured to learn intermediate variables for characterizing speech and noise properties, respectively. The audio pre-processing model(s) 202 can also include a speech filtration model that receives speech and noise characteristics from the speech and noise prediction models and that estimates a filtering mask used to predict a clean speech signal for subsequent use by one or more speech processing systems, such as ASR and wake-up systems. In some embodiments, the audio pre-processing model(s) 202 can use a multi-channel or multi-microphone approach to model both speech and noise separately by leveraging two subsets of audio input devices 204. Additionally, the audio pre-processing model(s) 202 can be progressively trained, such as where the speech and noise prediction models are trained in a first training phase and final stages of the model (like speech filtration and clean speech predictions) are trained in a second training phase.

The system 200 can also include one or more speech recognition models 206 that receive denoised audio data or signals from the pre-processing model(s) 202, such as one or more wake word detector models trained to recognize one or more wake words or phrases in the denoised audio data or signals that can trigger further automated speech or other processes and performance of actions by the electronic device 101. The speech recognition model(s) 206 can also include one or more ASR models and/or one or more natural language understanding (NLU) models that use the denoised audio data or signals to determine commands or actions included in utterances in the denoised audio data or signals that cause the processor 120 to instruct one or more actions by the electronic device 101 or by one or more other electronic devices. It will be understood that the machine learning models 202, 206 can be stored in a memory of the electronic device 101 (such as the memory 130) and accessed by the processor 120 to perform audio denoising tasks, automated speech recognition tasks, or other tasks. However, the machine learning models 202, 206 can be stored in any other suitable manner.

In some cases, the system 200 can include at least one audio output device 208 (such as a speaker or headphone interface) and at least one display 210 (such as a screen or a monitor like the display 160). In some embodiments of this disclosure, the processor 120 can receive an audio input from the audio input device(s) 204 and provide the audio input to the trained audio pre-processing models(s) 202. The trained audio pre-processing models(s) 202 can clean or denoise the audio data or signals, and the processor 120 can provide the denoised audio data or signals to the speech recognition model(s) 206 to perform one or more other tasks. The other tasks may include one or more speech recognition tasks (like wake word detection or wake-up procedures) or one or more ASR tasks (like detecting user intent and commands in the denoised audio data or signals to be used by the processor 120 in instructing one or more further actions by the electronic device 101 or one or more other electronic devices).

As a particular example, assume an audio input including an utterance is received from a user via the audio input device 204, where the utterance includes a wake word or phrase (such as "hey BIXBY, call mom"). Here, the trained audio pre-processing model(s) 202 can denoise/clean the audio input, and the processor 120 can provide the denoised/cleaned audio to a wake word detector model that detects the presence of the wake word "BIXBY" or the wake phrase "hey, BIXBY." One or more other ASR/NLU models can be triggered to determine an action from the audio, and the processor 120 can instruct the audio output device 208 to output "calling Mom." In this example, the processor 120 can cause a phone application or other communication application to begin a communication session with a "mom" contact stored on the electronic device 101 or otherwise in association with the user of the electronic device 101. As another particular example, suppose an utterance of "hey BIXBY, start a timer" is received. The trained audio pre-processing model(s) 202 can denoise/clean the audio input, and the processor 120 can provide the denoised/cleaned audio to a wake word detector model that may detect the presence of the wake word "BIXBY" or the wake phrase "hey, BIXBY." One or more ASR/NLU models can be triggered to determine an action from the audio, and the processor 120 may instruct execution of a timer application and display of a timer on the display 210 of the electronic device 101.

The audio pre-processing models 202 of this disclosure, including speech denoising and/or speech enhancement models, can be a key component to enable various audio applications. Systems that do not include speech denoising and/or speech enhancement models are disadvantageous because received audio inputs will be supplied to speech processing systems, such as ASR and wake-up services, with contaminated and noisy audio, reducing the accuracy of the speech processing systems. Therefore, embodiments of this disclosure include one or more audio pre-processing models 202 acting as an audio pre-processing front-end to reduce or remove various environmental noises contaminating the audio so that subsequent speech processing systems, such as ASR and wake-up services, can still work properly with minimal or no performance degradation.

In some embodiments, the audio pre-processing model(s) 202 can be configured for always-on listening to process all incoming audio streams and can be executed in very low power computation and limited memory devices and platforms where minimal resource consumption is desired. The audio pre-processing model(s) 202 of this disclosure may allow for running always-on small-footprint machine learning preprocessing services on edge devices, which provides advantages such as privacy, low latency, low bandwidth, and low power consumption as described above.

Although FIG. 2 illustrates one example of an audio denoising system 200, various changes may be made to FIG. 2. For example, the audio input device 204, the audio output device 208, and the display 210 can be connected to the processor 120 within the electronic device 101, such as via wired connections or circuitry. In other embodiments, the audio input device 204, the audio output device 208, and the display 210 can be external to the electronic device 101 and connected via wired or wireless connections. Also, separate models that are described in this disclosure and that are included in the audio pre-processing model(s) 202 can be stored as separate models called upon by the processor 120 to perform certain tasks or can be included in and form a part of one or more larger machine learning models. Further, in some embodiments, one or more of the machine learning models, including the audio pre-processing model(s) 202 and the speech recognition model(s) 206, can be stored remotely from the electronic device 101, such as on the server 106. Here, the electronic device 101 can transmit requests including inputs (such as captured audio data) to the server 106 for processing of the inputs using the machine learning model(s), and the results can be sent back to the electronic device 101, such as to instruct the electronic device 101 to perform at least one subsequent action based on the audio inputs.

Figure 3:
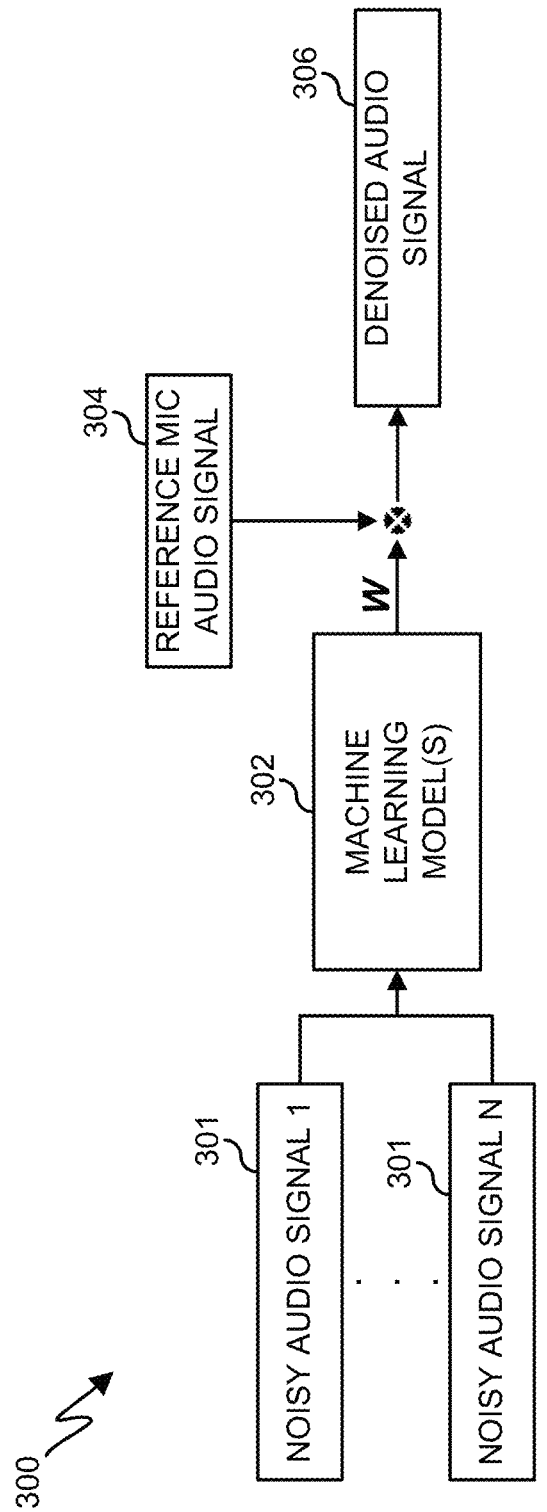
FIG. 3 illustrates an example audio denoising process in accordance with embodiments of this disclosure.

FIG. 3 illustrates an example audio denoising process 300 in accordance with embodiments of this disclosure. For ease of explanation, the process 300 is described as involving the use of the electronic device 101 in the network configuration 100 of FIG. 1. However, the process 300 may be used with any other suitable electronic device (such as the server 106) or a combination of devices (such as the electronic device 101 and the server 106) and in any other suitable system(s).

As shown in FIG. 3, the process 300 includes one or more machine learning models 302 receiving one or more noisy audio signals 301. In some embodiments, the machine learning model(s) 302 can represent the audio pre-processing models(s) 202 described above with respect to FIG. 2. The machine learning model(s) 302 can include one or more neural networks, such as one or more fully-connected networks, convolutional neural networks (CNNs), recurrent neural networks (RNNs), etc. The machine learning model(s) 302 can be configured to predict a denoising (filtering) mask, which in various embodiments is an SNR-dependent variable, based on a capability of the machine learning model(s) 302 learned in advance to estimate signal and noise intermediate variables to improve final audio quality.

During example operation, the processor 120 can extract any acoustic features (such as magnitude spectrum distribution information) from the raw noisy audio signals 301 and can input the extracted acoustic features to the machine learning model(s) 302. Speech and noise components among a frequency spectrum can be estimated from the audio inputs by the machine learning model(s) 302 for denoising purposes, and the estimation of the speech and noises components can be converted into a sequence of intermediate variables. The estimated intermediate variables for speech and noise can reflect the SNR for each frequency bin (the intervals between samples in the frequency domain) and can be constructed into a filtering mask via the estimated SNR for each frequency component. The predicted SNR-dependent filtering mask can be combined (such as multiplied) with a reference microphone audio signal 304 (such as one of the noisy audio signals 301 like noisy audio signal #1 shown in FIG. 3) to output a denoised audio signal 306. In this way, instead of directly learning clean speech as a target, the speech and noise components for each frequency bin are estimated as learnable intermediate parameters to construct the SNR-dependent filtering mask. This approach can result in a tiny machine learning model that can be deployed on resource-constrained electronic devices or other devices.

Although FIG. 3 illustrates one example of an audio denoising process 300, various changes may be made to FIG. 3. For example, separate models that are described in this disclosure and that are included in the machine learning model(s) 302 can be stored as separate models called upon by the processor 120 to perform certain tasks or can be included in and form a part of one or more larger machine learning models. Also, the process 300 may be performed using a distributed architecture. For instance, the machine learning model(s) 302 could be executed on a client electronic device (such as electronic device 101) or at a server (such as server 106). When executed by the server, the server may provide the client electronic device with the determined action(s) to be performed by the client electronic device. In some embodiments, the client electronic device can provide audio data received via an audio input device of the client electronic device to the server, audio denoising can be performed by the server, and one or more ASR/NLU models can be executed by either the client electronic device or the server based on the denoised audio data.

Figure 4:
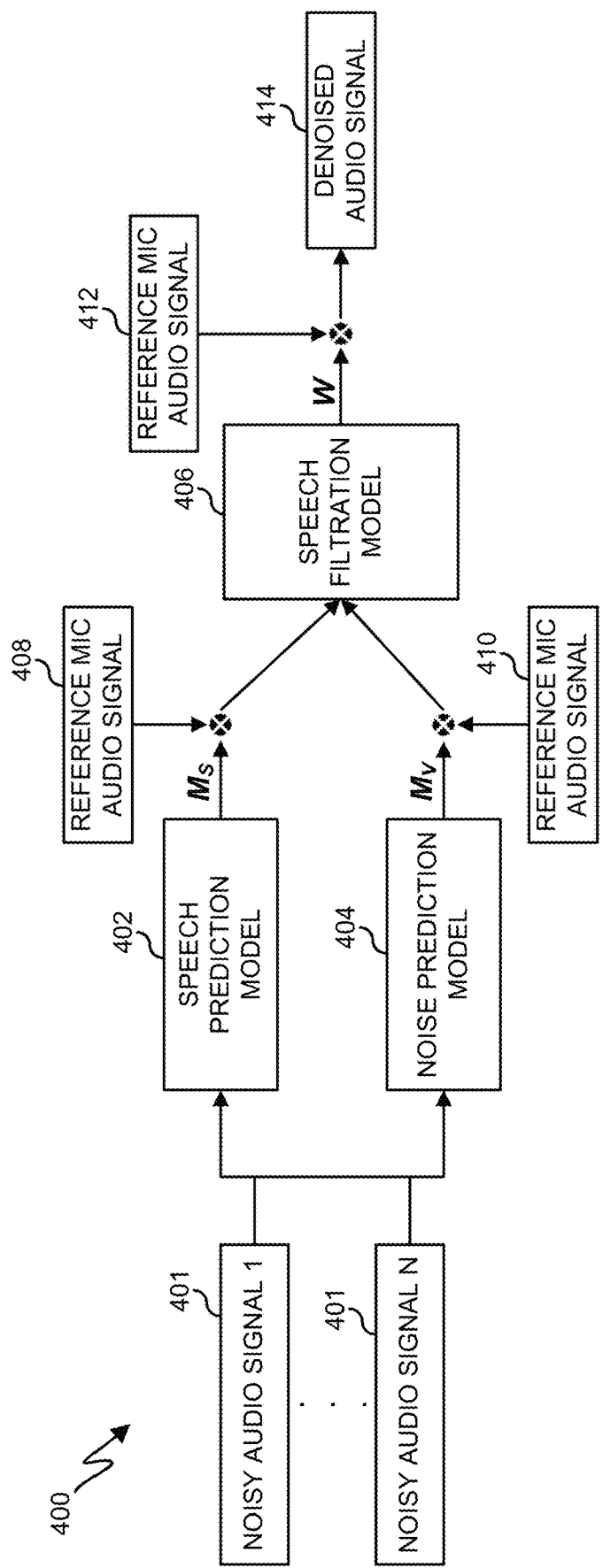
FIG. 4 illustrates an example mask estimation and audio denoising process in accordance with embodiments of this disclosure.

FIG. 4 illustrates an example mask estimation and audio denoising process 400 in accordance with embodiments of this disclosure. For ease of explanation, the process 400 is described as involving the use of the electronic device 101 in the network configuration 100 of FIG. 1. However, the process 400 may be used with any other suitable electronic device (such as the server 106) or a combination of devices (such as the electronic device 101 and the server 106) and in any other suitable system(s).

As shown in FIG. 4, the process 400 includes the use of a speech prediction model 402, a noise prediction model 404, and a speech filtration model 406. The speech prediction model 402, the noise prediction model 404, and the speech filtration model 406 can be included in the audio pre-processing models(s) 202 and/or the machine learning model(s) 302 described above with respect to FIGS. 2 and 3 and can include one or more neural networks, such as one or more fully-connected networks, CNNs, RNNs, etc.

During example operation, the processor 120 can extract acoustic features (such as magnitude spectrum distribution information) from noisy audio signals 401 received from audio input devices (such as microphones) and input the extracted acoustic features to the speech prediction model 402 and the noise prediction model 404. The speech prediction model 402 and the noise prediction model 404 can be trained to process the acoustic features and estimate speech and noise intermediate variables to improve final audio quality. For example, the speech prediction model 402 can be trained to estimate a speech mask ($M_S$) and the noise prediction model can be trained to estimate a noise mask ($M_V$) from the acoustic features of the audio inputs 401. These estimated speech and noise masks can reflect the SNR for each frequency bin (the intervals between samples in the frequency domain).

In some embodiments, the process 400 can use the speech prediction model 402 and the noise prediction model 404 to model both speech and noise separately by leveraging two subsets of audio devices (such as microphones). For example, the process 400 can leverage multi-channel/multi-microphone raw data inputs and can make use of the two-branch model architecture described above to apply separate subsets of microphone data to the speech prediction model 402 and the noise prediction model 404, such as by providing noisy audio signal #1 data to the speech prediction model 402 and providing noisy audio signal #N data to the noise prediction model 404. Some microphones can possibly be closer to a noise source, whereas other microphones can possibly be closer to a speech source. Thus, some microphones might have more information about noise characteristics, and other microphones might have more information about speech characteristics. To leverage those situations, the process 400 can use (i) a first subset of acoustic features from a first subset of the microphones for estimating the speech characteristics using the speech prediction model 402 and (ii) a second subset of acoustic features from a second subset of the microphones to estimate the characteristics of the noise using the noise prediction model 404. In some embodiments, however, a single microphone can be used, where audio signals from the single microphone are extracted and provided to both the speech prediction model 402 and the noise prediction model 404.

The process 400 can use the output estimated speech mask ($M_S$) and the estimated noise mask ($M_V$) to estimate a filtering mask (W). For example, after the speech mask and noise mask are created from the acoustic feature subsets, the estimated speech mask can be combined (such as multiplied) with a first reference microphone signal 408 (such as noisy audio signal #1 in FIG. 4), and the estimated noise mask can be combined (such as multiplied) with a second reference microphone signal 410 (such as noisy audio signal #N in FIG. 4) to predict speech and noise components for use by the speech filtration model 406. By filtering the speech and noise from some reference microphones in a subset, the speech and noise information can be fused together for further processing by the speech filtration model 406. Fusing the speech and noise components can involve concatenation of the information or could use other information fusion techniques, like partial processing and layer-wise multiplication.

The speech filtration model 406 receives the fused speech and noise components and outputs the filtering mask (W). The filtering mask can be SNR-dependent and can be estimated using an estimated SNR for each frequency component based on the speech and noise components. In this way, instead of directly learning clean speech as a target, the speech and noise components for each frequency bin can be estimated as learnable intermediate parameters to construct the SNR-dependent filtering mask. Utilizing the predicted speech and noise component improves the estimation of the final SNR-dependent filtering mask. That is, instead of needing to learn the clean speech directly, the process 400 can be used to learn the intermediate masks/filters $M_S$, $M_V$, and W. In some embodiments, $$M_S = \frac{|S|}{|X|},\ M_v = \frac{|V|}{|X|},\text{ and } W = \frac{|S|^2}{|S|^2+|V|^2} = \frac{SNR}{SNR+1}.$$

In some embodiments, the SNR filtering mask can be a Wiener-like ideal ratio mask.

In some embodiments, the filtering mask (W) can be combined (such as multiplied) with a third reference microphone signal 412 (such as one of the noisy audio signals 301) to extract a denoised/clean audio signal 414 from the reference microphone signal 412. The denoised/clean audio signal can be used for performing at least one more-accurate speech recognition process, such as wake word detection and wake up processes and/or ASR/NLU processes. The process 400 results in a tiny machine learning model that can be deployed on resource-constrained electronic devices or other devices. For instance, the mask estimation performed by the process 400 provides for smaller machine learning models, which allows for deployment on devices with lower memory and lower computational resources.

Although FIG. 4 illustrates one example of a mask estimation and audio denoising process 400, various changes may be made to FIG. 4. For example, the separate models that are described in this disclosure (such as the speech prediction model 402, the noise prediction model 404, and the speech filtration model 406) can be stored as separate models called upon by the processor 120 to perform certain steps of the process 400 or can be included in and form a part of one or more larger machine learning models. Also, the process 400 may be performed using a distributed architecture. For instance, the speech prediction model 402, the noise prediction model 404, and the speech filtration model 406 could be executed on a client electronic device (such as electronic device 101) or at a server (such as server 106). When executed by the server, the server may provide the client electronic device with the determined action(s) to be performed by the client electronic device. In some embodiments, the client electronic device can provide audio data received via an audio input device of the client electronic device to the server; audio denoising can be performed by the server using the speech prediction model 402, the noise prediction model 404, and the speech filtration model 406; and one or more ASR/NLU models can be executed by either the client electronic device or the server based on the denoised audio data.

Figure 5A:
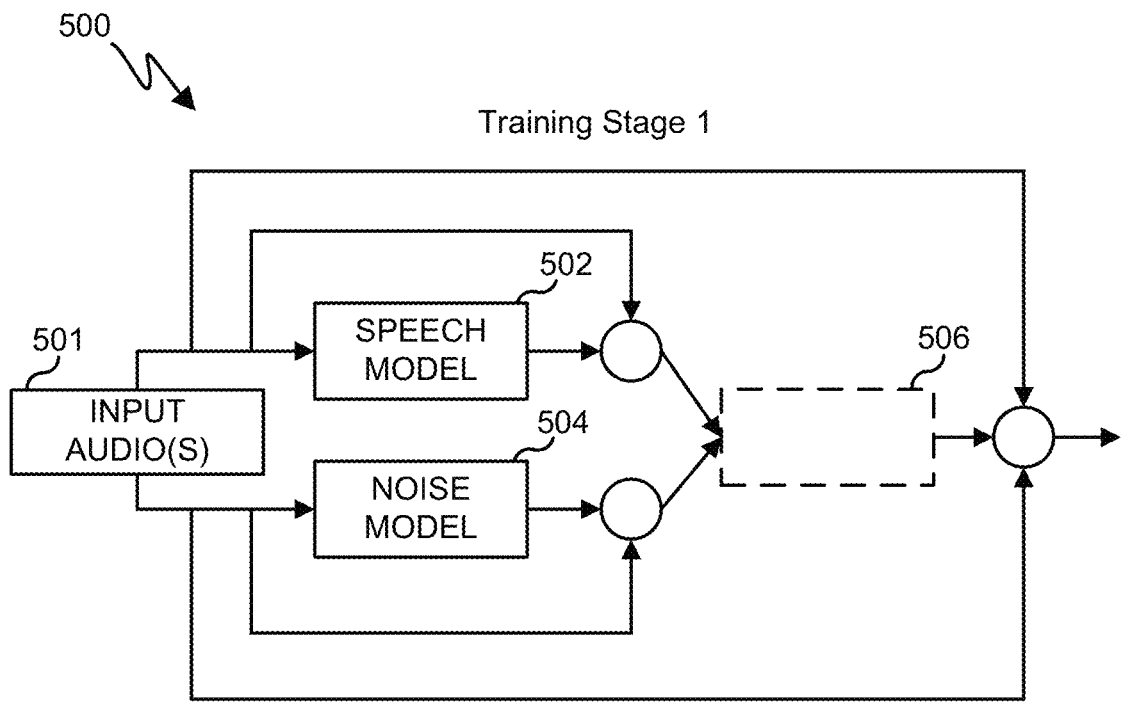
FIGS. 5A and 5B illustrate an example two-stage denoising training process in accordance with embodiments of this disclosure.
Figure 5B:
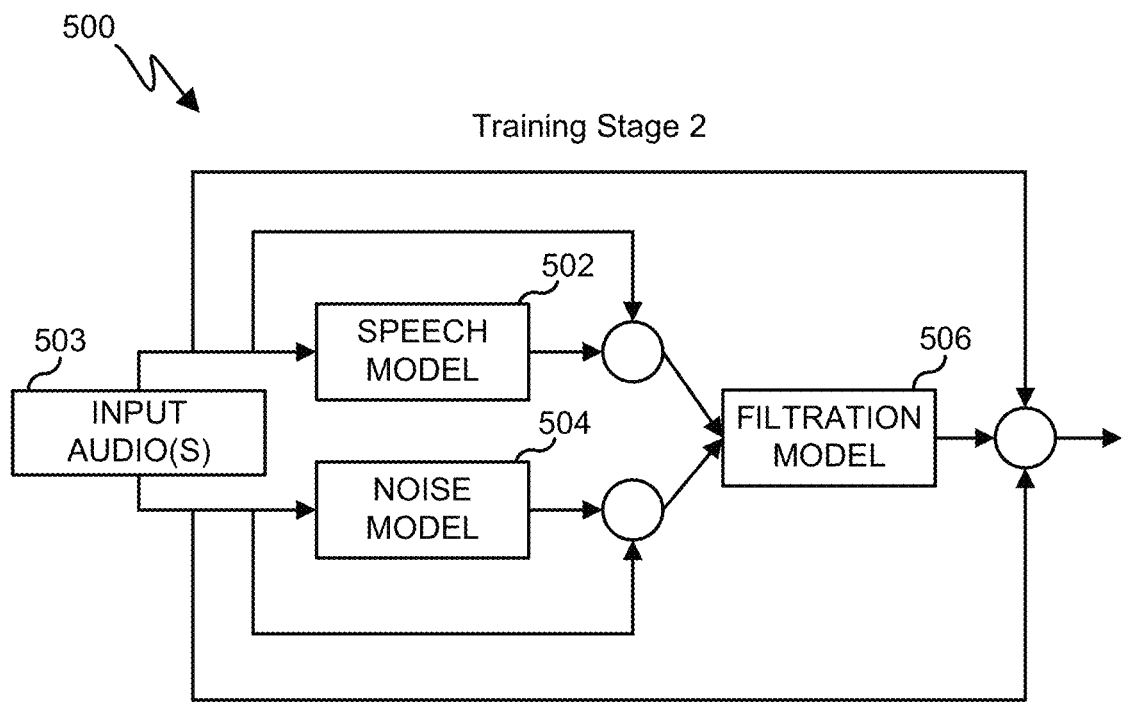

FIGS. 5A and 5B illustrate an example two-stage denoising training process 500 in accordance with embodiments of this disclosure. For ease of explanation, the process 500 is described as involving the use of the server 106 in the network configuration 100 of FIG. 1. As a particular example, the process 500 can be executed on the server 106 in the network configuration 100 of FIG. 1, and one or more trained machine learning models (such as a trained speech prediction model, a trained noise prediction model, and a trained speech filtration model) can be deployed to a client electronic device 101 for use. However, the process 500 may be used with any other suitable device(s), such as the electronic device 101, and in any other suitable system(s).

Given that the denoising systems of this disclosure can be constrained to a fewer number of parameters compared to existing deep learning models, it can be advantageous in some cases for each model of the system to be trained with inputs that most closely resemble ground truths in order to teach the models what speech and noise look like. To achieve this, training can be divided into multiple stages. For example, the process 500 progressively trains the machine learning models using two training stages. As shown in FIG. 5A, the process 500 includes a first training stage in which a speech model 502 (such as the speech prediction model 402 in FIG. 4) and a noise model 504 (such as the noise prediction model 404 in FIG. 4) are trained. The first stage here does not include performing any training of a filtration model 506 (such as the speech filtration model 406 in FIG. 4).

The first stage training of the speech model 502 and the noise model 504 to predict the speech and noise masks, respectively, includes training the speech model 502 and the noise model 504 using training data that includes input audios 501 with corresponding ground truth speech and noise masks. In some embodiments, the input audios 501 can include one or more of (i) noisy speech signals, (ii) clean speech signals, and (iii) noise signals. During the first stage training, the speech model 502 and the noise model 504 are updated, such as by using a loss function, to reduce or minimize a difference or loss between an output speech mask ($M_S$) and a ground truth speech mask and to reduce or minimize a difference or loss between an output noise mask ($M_\nu$) and a ground truth noise mask, respectively. In some cases, this can be expressed as a minimization of $\mathcal{L}(\hat{M}_S, M_S) + \mathcal{L}(\hat{M}_\nu, M_\nu)$. The loss function calculates the error or loss associated with the predictions of the speech model 502 and the noise model 504.

As an example, when the outputs of the speech model 502 and/or the noise model 504 differ from the ground truths, the differences can be used to calculate a loss as defined by the loss function. The loss function may use any suitable measure of loss associated with outputs generated by the speech model 502 and the noise model 504, such as a cross-entropy loss or a mean-squared error. Multiple training iterations can be performed during the first stage training shown in FIG. 5A until a determination is reached that the first stage training of the speech model 502 and the noise model 504 is complete, such as upon a determination that the models 502, 504 are providing predictions at an acceptable accuracy level. When the loss calculated by the loss function is larger than desired, the parameters of the models 502, 504 can be adjusted. Once adjusted, the same or additional training data can be provided to the adjusted models 502, 504, and additional outputs from the models 502, 504 can be generated and compared to the ground truths so that additional losses can be determined using the loss function. Ideally, over time, the models 502, 504 produce more accurate outputs that more closely match the ground truths, and the measured loss becomes less. The amount of training data used can vary depending on the number of training cycles. At some point, the measured loss can drop below a specified threshold, and the first training stage can be completed. The first training stage allows the speech model 502 and the noise model 504 to learn to predict masks with accuracy prior to training the filtration model 506.

Following the first training stage, as shown in FIG. 5B, the final phases of the system are trained during a second training stage. In the second training stage, the speech model 502, the noise model 504, and the filtration model 506 are jointly trained to predict the final output mask (the filtering mask (W)) using one or more training samples including input audios 503. Each training sample is associated with a ground truth filtering mask. The speech model 502, the noise model 504, and the filtering model 506 are updated, such as by using a loss function, during the second stage training to reduce or minimize a difference between the predicted filtering mask and the ground truth filtering mask. In some cases, this can be expressed as a minimization of $\mathcal{L}(\hat{W}, W)$. The loss function calculates the error or loss associated with the predictions of the ultimate filtering mask output by the denoising system.

As an example, when the filtering mask output by the filtering model is received, the differences between the filtering mask and the ground truth can be used to calculate a loss as defined by the loss function. The loss function may use any suitable measure of loss associated with filtering mask outputs, such as a cross-entropy loss or a mean-squared error. Multiple training iterations can be performed during the second stage training shown in FIG. 5B until a determination is reached that the second stage joint training of the speech model 502, the noise model 504, and the filtration model 506 is complete, such as upon a determination that the models 502, 504, 506 are providing filtering mask predictions at an acceptable accuracy level. When the loss calculated by the loss function is larger than desired, the parameters of one or more of the models 502, 504, 506 can be adjusted. Once adjusted, the same or additional training data can be provided to the adjusted models 502, 504, 506, and additional filtering mask outputs can be generated and compared to the ground truths so that additional losses can be determined using the loss function. Ideally, over time, the models 502, 504, 506 produce more accurate outputs that more closely match the ground truths, and the measured loss becomes less. The amount of training data used can vary depending on the number of training cycles. At some point, the measured loss can drop below a specified threshold, and the second stage training can be completed. As such, the system is progressively trained starting from the initial modules and then moving downstream. Since the initial speech model 502 and the noise model 504 are already trained, the audio inputs to the downstream models closely resemble the ground truths, greatly improving learning and accuracy of the entire denoising system.

Although FIGS. 5A and 5B illustrate one example of a two-stage denoising training process 500, various changes may be made to FIGS. 5A and 5B. For example, the separate models that are described in this disclosure (such as the speech model 502, the noise model 504, and the filtration model 506) can be stored as separate models called upon by the processor 120 to perform certain steps of the training process 500 or can be included in and form a part of one or more larger machine learning models. Also, the process 500 may be performed using an electronic device 101, rather than the server 106, in some embodiments.

Figure 6:
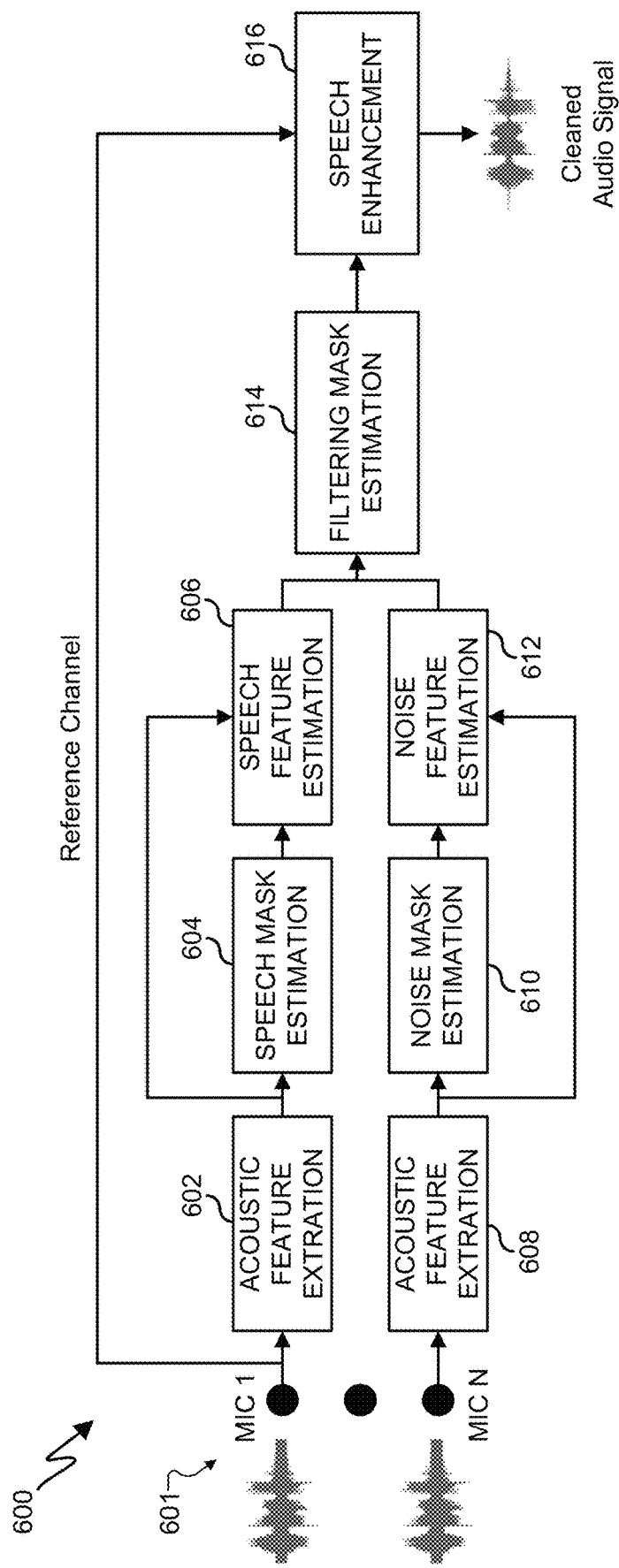
FIG. 6 illustrates an example multi-channel mask estimation and audio denoising process in accordance with embodiments of this disclosure.

FIG. 6 illustrates an example multi-channel mask estimation and audio denoising process 600 in accordance with embodiments of this disclosure. For ease of explanation, the process 600 is described as involving the use of the electronic device 101 in the network configuration 100 of FIG. 1. However, the process 600 may be used with any other suitable electronic device (such as the server 106) or a combination of devices (such as the electronic device 101 and the server 106) and in any other suitable system(s).

As described above, some microphones may be closer to a noise source, and microphones may be closer to a speech source. Thus, some microphones might have more information about noise characteristics, and other microphones might have more information about speech characteristics. As shown in FIG. 6, to leverage those situations, the process 600 can use acoustic features from a first subset of a plurality of microphones 601 for estimating speech characteristics and use acoustic features from a second subset of microphones of the plurality of microphones 601 to estimate noise characteristics. The process 600 begins with the plurality of microphones 601 receiving noisy audio signals. Acoustic features are extracted from each audio channel, such as by using a time-frequency analysis to transform the audio waveforms into spectral-temporal representations. For example, at step 602, a first subset of acoustic features (such as magnitude spectrum distribution information) is extracted from a first subset of audio channels associated with one or more of the plurality of microphones 601. At step 604, a multiplicative speech mask is estimated from the first subset of acoustic features using a speech prediction model, such as the speech prediction model 402 as described above with respect to FIG. 4. As described in this disclosure, the speech prediction model can be trained using ground truth clean speech data. At step 606, speech features are estimated using the estimated speech mask. For instance, as described above with respect to FIG. 4, after the speech mask is extracted from the first subset of acoustic features, the estimated speech mask can be combined (such as multiplied) with a first reference microphone signal to estimate speech features of the audio data. Thus, the estimated speech mask and the noisy speech acoustic features from the first subset are used to compute estimates of the clean speech acoustic features.

At step 608, a second subset of acoustic features (such as magnitude spectrum distribution information) is extracted from a second subset of audio channels associated with one or more of the plurality of microphones 601. At step 610, a multiplicative noise mask is estimated from the second subset of acoustic features using a noise prediction model, such as the noise prediction model 404 as described above with respect to FIG. 4. As described in this disclosure, the noise prediction model can be trained using ground truth noise data. At step 612, noise features are estimated using the estimated noise mask. For instance, as described above with respect to FIG. 4, after the noise mask is extracted from the second subset of acoustic features, the estimated noise mask can be combined (such as multiplied) with a second reference microphone signal to estimate noise features of the audio data. The estimated noise mask and the noisy speech acoustic features from the second subset are used to compute estimates of the noisy acoustic features.

By filtering the speech and noise from some reference microphone audio in a subset, speech and noise information can be fused together for further processing at step 614. Fusing the estimated speech and noise features can involve concatenation of the information or could use other information fusion techniques, such as partial processing and layer wise multiplication. At step 416, the fused speech and noise features are provided to a speech filtration model, such as the speech filtration model 406 described above with respect to FIG. 4. At step 416, a multiplicative filtering mask is estimated from the speech and noise features. In some embodiments of this disclosure, the estimated filtering mask can be SNR-dependent and can be estimated using an estimated SNR for each frequency component based on the speech and noise features. In this way, instead of directly learning clean speech as a target, the speech and noise components for each frequency bin can be estimated as learnable intermediate parameters to construct the SNR-dependent filtering mask. Utilizing the predicted speech and noise components improves the estimation of the final SNR-dependent filtering mask. That is, instead of needing to learn the clean speech directly, the process 400 is used to learn the intermediate masks/filters, which provides for smaller machine learning models and allows for deployment on devices with lower memory and lower computational resources.

At step 616, speech enhancement is performed using the filtering mask to create a cleaned/denoised audio signal, such as for use by one or more other machine learning models like wake word detection models or ASR/NLU models. At step 616, the filtering mask is combined (such as multiplied) with a third reference microphone signal (such as one of the noisy audio signals received from the microphones 601) to extract the denoised/clean audio signal from the reference microphone signal.

Although FIG. 6 illustrates one example of a multi-channel mask estimation and audio denoising process 600, various changes may be made to FIG. 6. For example, steps 602-606 and steps 608-612 could be performed sequentially or substantially simultaneously. Also, the separate models that are described in this disclosure (such as the speech prediction model 402, the noise prediction model 404, and the speech filtration model 406) can be stored as separate models called upon by the processor 120 to perform certain steps of the process 600 or can be included in and form a part of one or more larger machine learning models. Also, the process 600 may be performed using a distributed architecture. For instance, the speech prediction model, the noise prediction model, and the speech filtration model could be executed on a client electronic device (such as electronic device 101) or at a server (such as server 106). When executed by the server, the server may provide the client electronic device with the determined action(s) to be performed by the client electronic device. In some embodiments, the client electronic device can provide audio data received via an audio input device of the client electronic device to the server, audio denoising can be performed by the server using the speech prediction model, the noise prediction model, and the speech filtration model, and one or more ASR/NLU models can be executed by either the client electronic device or the server based on the denoised audio data.

Figure 7:
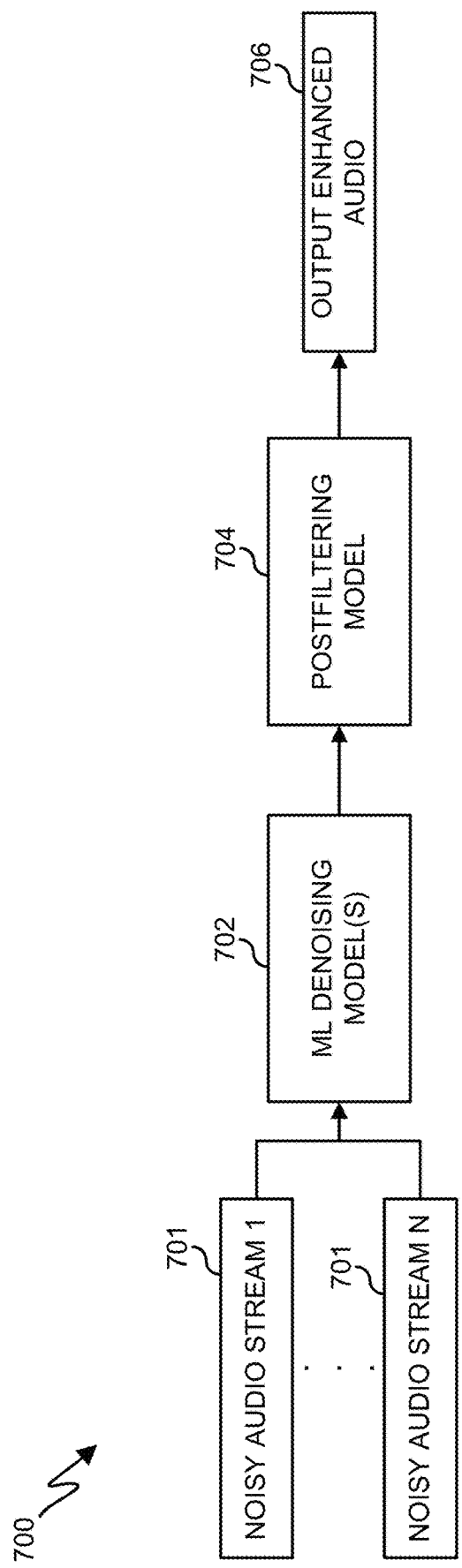
FIG. 7 illustrates an example audio denoising and post-filtering process in accordance with embodiments of this disclosure.

FIG. 7 illustrates an example audio denoising and post-filtering process 700 in accordance with embodiments of this disclosure. For ease of explanation, the process 700 is described as involving the use of the electronic device 101 in the network configuration 100 of FIG. 1. However, the process 700 may be used with any other suitable electronic device (such as the server 106) or a combination of devices (such as the electronic device 101 and the server 106) and in any other suitable system(s).

In some embodiments of this disclosure, one or more machine learning models, such as the machine learning model(s) 202 of FIG. 2, the machine learning model(s) 302 of FIG. 3, or the models 402-406 of FIG. 4, may be accompanied by at least one other small-footprint postfiltering model. For example, as shown in FIG. 7, the process 700 includes one or more machine learning denoising models 702 that can receive noisy audio streams 701 and denoise/clean the noisy audio signals as described in this disclosure. The process 700 also includes a postfiltering model 704 that receives denoised audio signals from the machine learning denoising model(s) 702. The postfiltering model 704 further enhances the denoised audio signals and outputs enhanced audio signals at step 706. The postfiltering model 704 can apply various techniques to further enhance the audio signals, such as by applying a Wiener filter, spectral and/or temporal smoothing, beamforming, dictionary learning (such as nonnegative matrix factorization) based algorithms, etc. The postfiltering operations performed by the postfiltering model 704 remove residual noise from the cleaned audio signals output by the machine learning model(s) 704 for even further improved noise reduction.

Figure 8C:
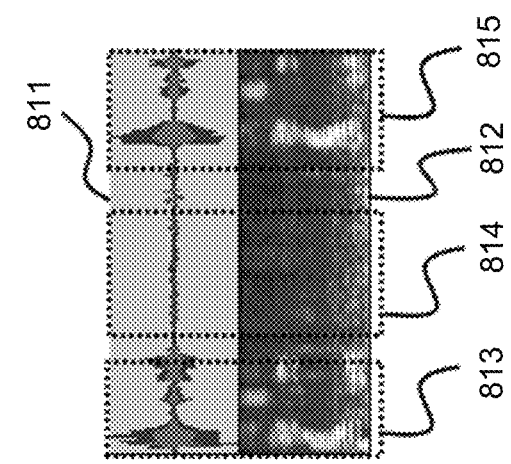
FIGS. 8A through 8C illustrate example audio signal waveforms and accompanying spectrograms in accordance with embodiments of this disclosure.
Figure 8B:
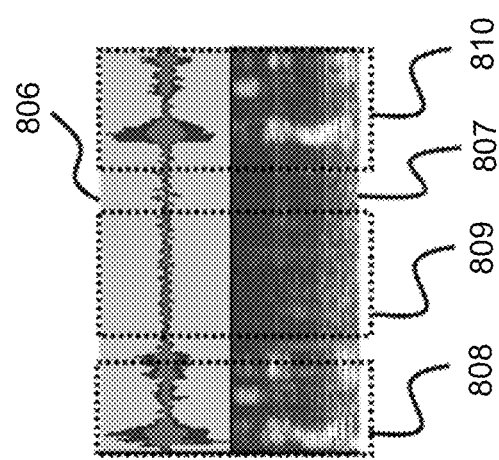
Figure 8A:
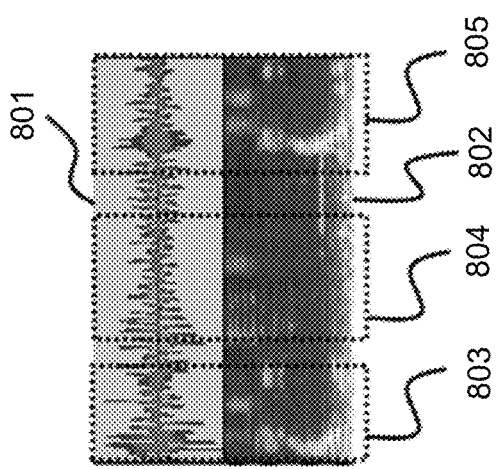

As examples, FIGS. 8A through 8C illustrate example audio signal waveforms and accompanying spectrograms in accordance with embodiments of this disclosure. In particular, FIG. 8A illustrates an example audio signal waveform 801 and accompanying spectrogram 802 generated without use of a denoising model, FIG. 8B illustrates an example audio signal waveform 806 and accompanying spectrogram 807 generated using a denoising model in accordance with this disclosure, and FIG. 8C illustrates an example audio signal waveform 811 and accompanying spectrogram 812 generated using a denoising model and a postfiltering model in accordance with this disclosure. It will be understood that the audio signal waveforms 801, 806, 811 and accompanying spectrograms 802, 807, and 812 are examples only and do not limit the scope of this disclosure.

The audio signal results shown in FIGS. 8A through 8C can correspond to a two-microphone system that receive noisy human speech and that process outputs in real-time. As shown in FIG. 8A, locations of speech 803 and 805 and locations of noise 804 are difficult to locate due to the overall noisy nature of the audio as shown in the erratic shape of the waveform 801. However, as shown by the waveform 806 of FIG. 8B, the use of denoising models as described in this disclosure results in a clear distinction between locations 808 and 810 that correspond to human speech and locations 809 that correspond to silence between speech. Noise in both the speech and silence locations are removed, while speech is also emphasized as can be seen by comparing the spectrogram 807 with the spectrogram 802. As shown in FIG. 8C, further noise reduction can be achieved by using a postfiltering model, such as the postfiltering model 704. As shown in FIG. 8C, noise is further reduced, and the differences between speech locations 813 and 815 and silence locations 814 are further emphasized and enhanced.

Although FIG. 7 illustrates one example of an audio denoising and postfiltering process 700, various changes may be made to FIG. 7. For example, the process 700 may also be performed using a distributed architecture. For example, separate models that are described in this disclosure (such as those included in the machine learning model(s) 702 and the postfiltering model 704) can be stored as separate models called upon by the processor 120 to perform certain tasks or can be included in and form a part of one or more larger machine learning models. Also, the process 700 may be performed using a distributed architecture. For instance, the machine learning model(s) 702 and postfiltering model 704 could be executed on a client electronic device (such as electronic device 101) or at a server (such as server 106). When executed by the server, the server may provide the client electronic device with the determined action(s) to be performed by the client electronic device. In some embodiments, the client electronic device can provide audio data received via an audio input device of the client electronic device to the server, audio denoising and postfiltering can be performed by the server, and one or more ASR/NLU models can be executed by either the client electronic device or the server based on the denoised audio data. Although FIGS. 8A through 8C illustrate examples of audio signal waveforms and accompanying spectrograms, various changes may be made to FIGS. 8A through 8C. For instance, audio data can vary widely depending on the circumstances, and FIGS. 8A through 8C do not limit this disclosure to any particular type(s) of audio data or to any particular type(s) of results obtained using the embodiments of this disclosure.

Figure 9A:
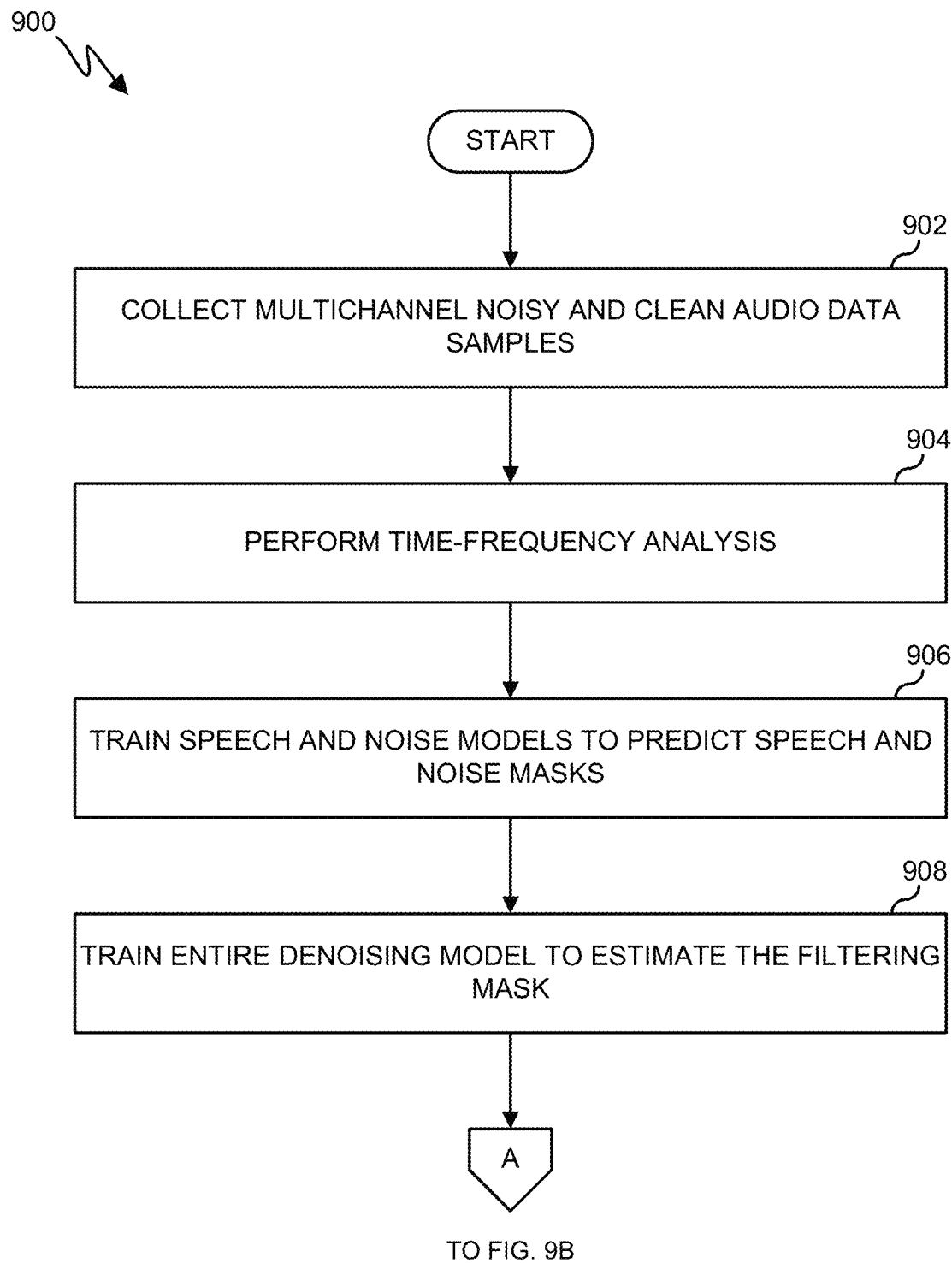
FIGS. 9A and 9B illustrate an example method for training and using one or more denoising machine learning models in accordance with embodiments of this disclosure.
Figure 9B:
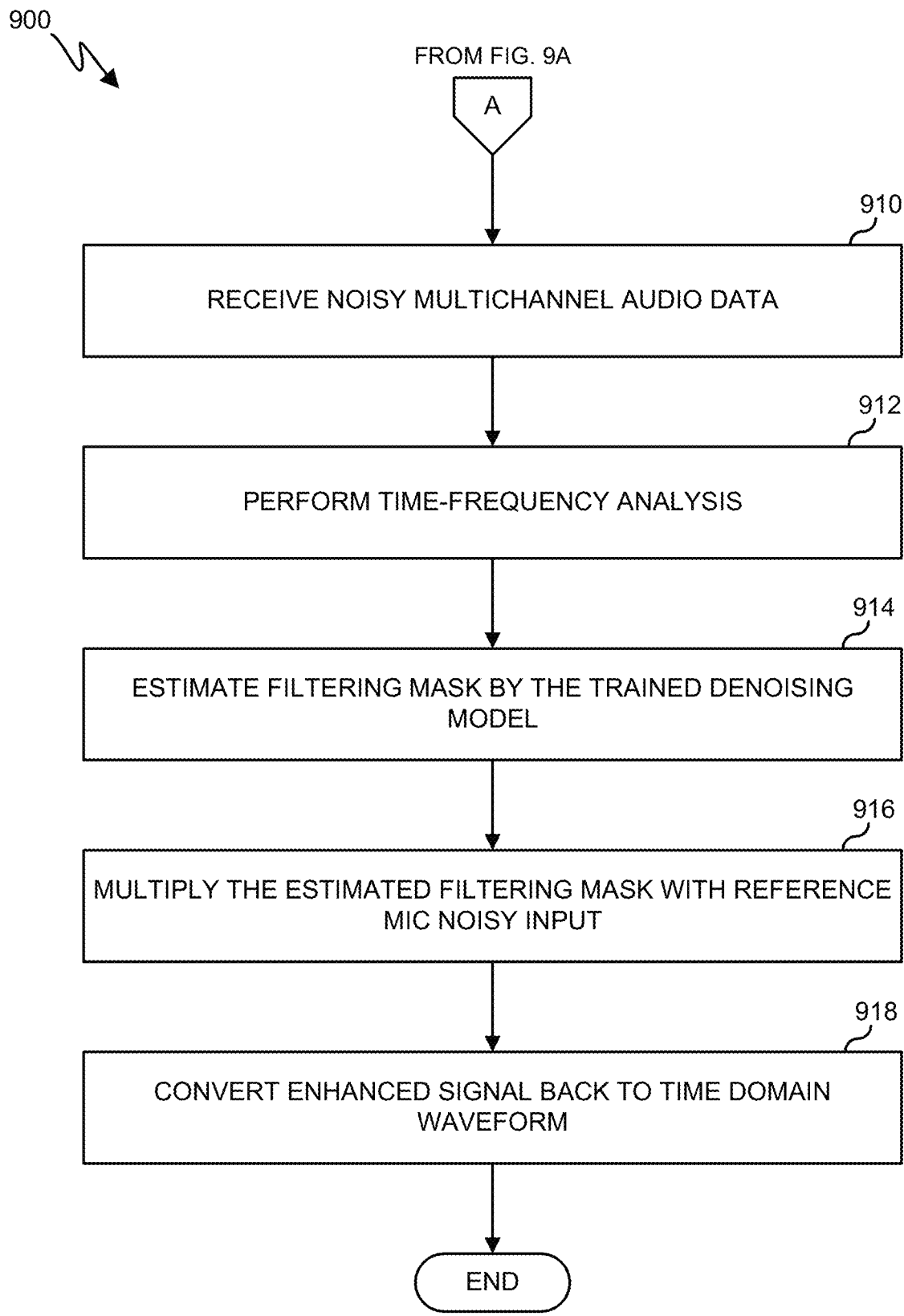

FIGS. 9A and 9B illustrate an example method 900 for training and using one or more denoising machine learning models in accordance with embodiments of this disclosure. For ease of explanation, the method 900 shown in FIGS. 9A and 9B is described as being performed using a combination of the server 106 and the electronic device 101 in the network configuration 100 of FIG. 1. As a particular example, part of the method 900 related to model training can be executed on the server 106, and part of the method 900 related to inferencing can be executed on the electronic device 101 after the trained machine learning models are deployed to the electronic device 101. However, the method 900 may be used with any other suitable device(s), such as just one of the electronic device 101 or the server 106, and in any other suitable system(s).

At block 902, the processor of a training device collects multi-channel noisy and clean audio data samples for use in supervised training of one or more denoising models, such as the speech model 502, the noise model 504, and the filtration model 506 described above with respect to FIG. 5. In some cases, this can be accomplished by recording real-world audio using the target electronic device or using room acoustic simulation processes to synthesize data. At block 904, the processor of the training device performs time-frequency analysis to transform the waveforms of the audio data samples into spectral-temporal representations, such as by performing short-time Fourier transform, wavelet transform, least-squares spectral analysis, or another transform function on the waveforms of the audio data.

Given that the denoising systems of this disclosure can be constrained to a fewer number of parameters compared to existing deep learning models, it can be advantageous in some cases for each model of the system to be trained with inputs that most closely resemble ground truths in order to teach the models what speech and noise look like. To achieve this, training can be divided into multiple stages. For example, the processor progressively trains the machine learning models using two training stages. At block 906, the processor of the training device, in the time-frequency domain, trains the speech and noise models to predict speech and noise masks, respectively. In a second training stage, the processor of the training device jointly trains the entire denoising network to estimate the final SNR-dependent filtering mask.

Once the denoising model is trained, the denoising model can be deployed to another electronic device and can be executed by a processor of that electronic device. For example, at block 910, the processor of an inferencing device uses one or more audio input devices to record noisy audio waveforms. At block 912, the processor of the inferencing device transforms the recorded raw audio data into time-frequency representations, such as by performing short-time Fourier transform, wavelet transform, least-squares spectral analysis, or another transform function on the waveforms of the recorded raw audio data. At block 914, the processor of the inferencing device, in the transformed domain, utilizes the trained denoising model to estimate a filtering mask by taking acoustic features extracted from the noisy data as inputs. At block 916, the processor of the inferencing device applies the estimated filtering mask to a reference microphone audio input to perform denoising to create an enhanced and denoised audio signal. At block 918, the processor of the inferencing device converts the enhanced audio signal back to the time domain audio waveform. The denoised audio can be used for performing at least one more-accurate speech recognition process, such as wake word detection and wake up processes and/or ASR/NLU processes as described in this disclosure.

Although FIGS. 9A and 9B illustrate one example of a method 900 for training and using one or more denoising machine learning models, various changes may be made to FIGS. 9A and 9B. For example, while shown as a series of steps, various steps in FIGS. 9A and 9B could overlap, occur in parallel, occur in a different order, or occur any number of times. As a particular example, blocks 906 and 908 could be performed any number of times or include additional sub-steps, such as using a loss function, for performing the two-stage training of the models. Also, block 918 could include an additional step of performing postfiltering on the enhanced audio signal as described in embodiments of this disclosure.

Figure 10A:
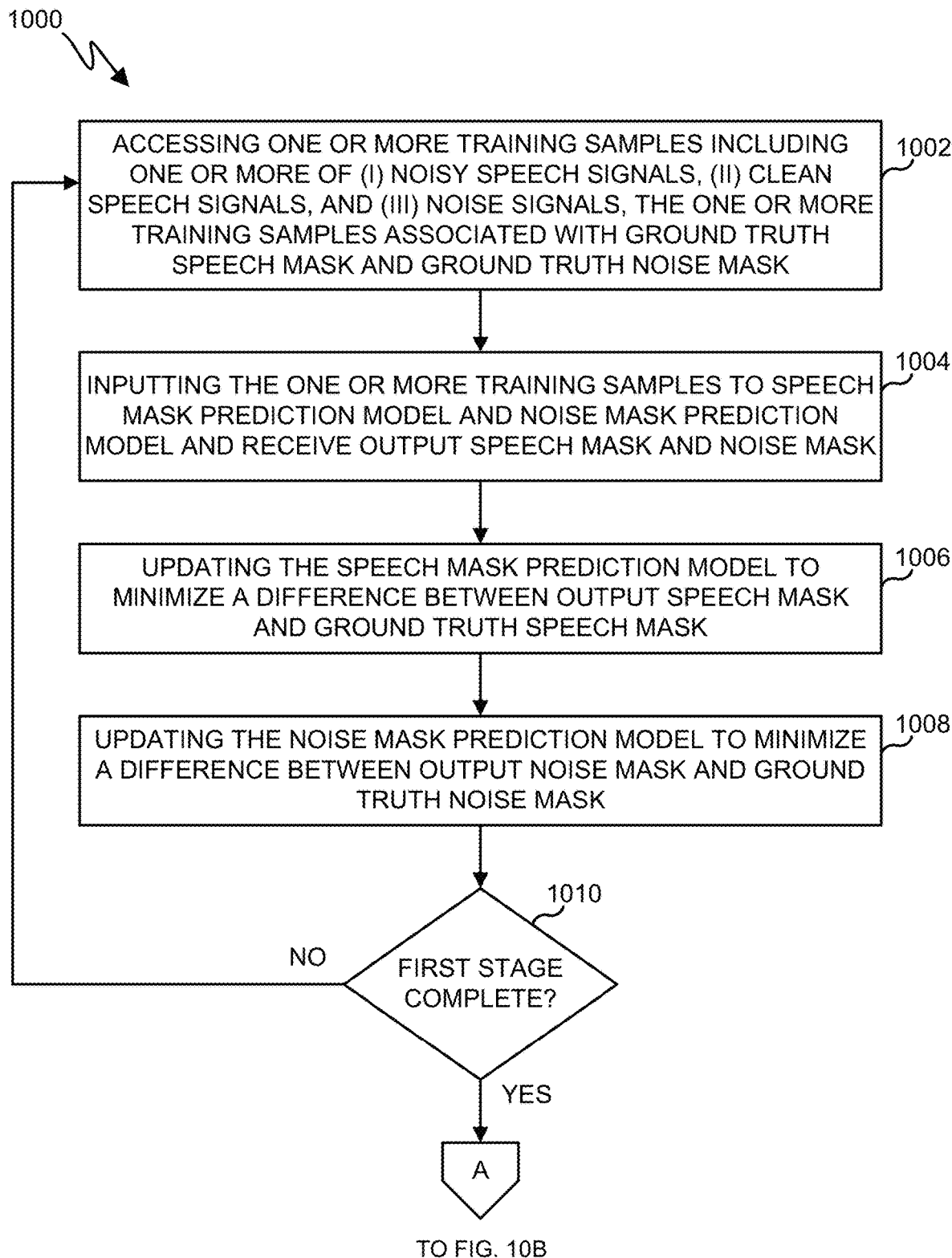
FIGS. 10A and 10B illustrate an example method for two-stage denoising model training in accordance with embodiments of this disclosure.
Figure 10B:
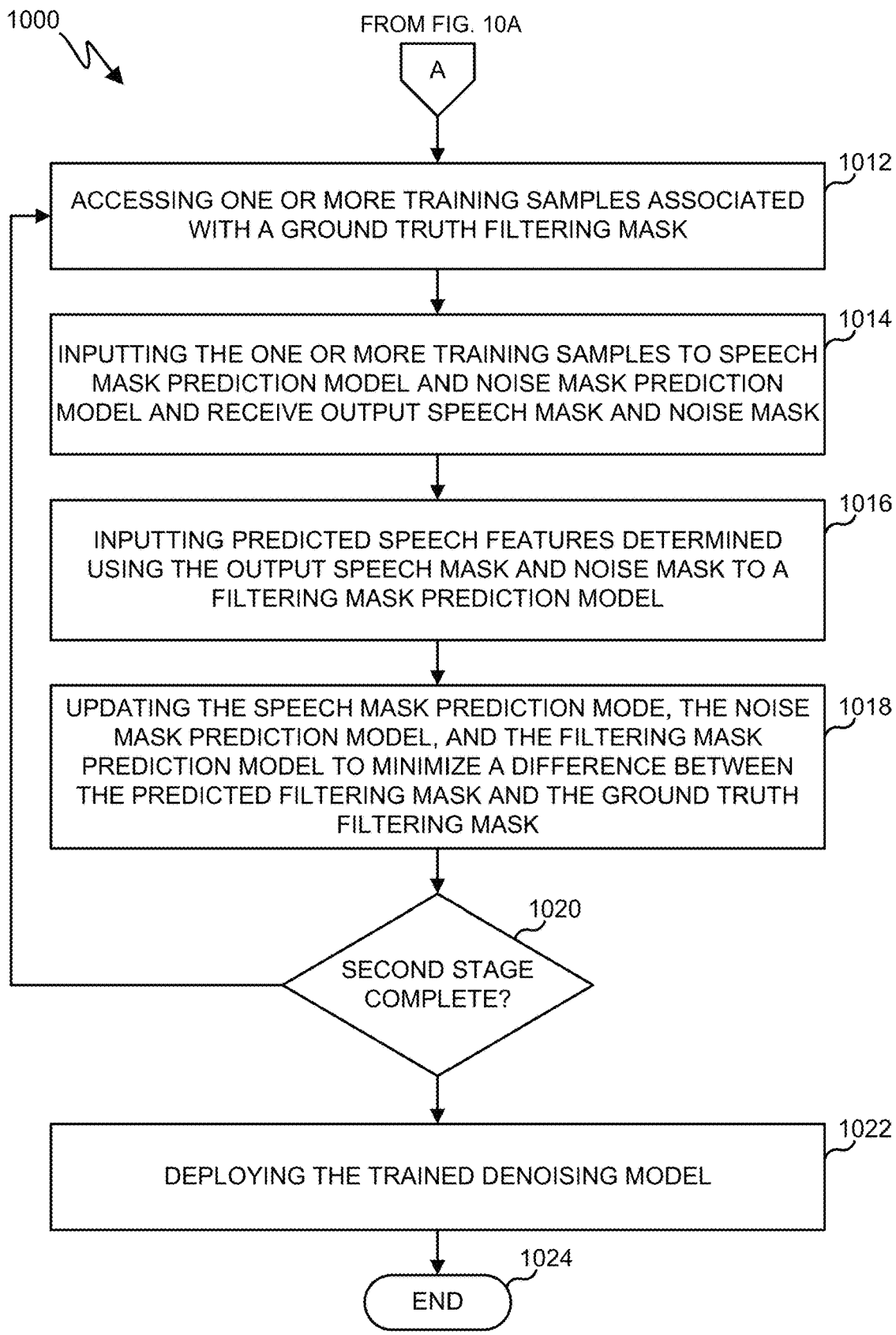

FIGS. 10A and 10B illustrate an example method 1000 for two-stage denoising model training in accordance with embodiments of this disclosure. For ease of explanation, the method 1000 shown in FIGS. 10A and 10B is described as being performed using the server 106 in the network configuration 100 of FIG. 1. As a particular example, the method 1000 can be executed on the server 106 in the network configuration 100 of FIG. 1, and one or more trained machine learning models (such as trained speech prediction, noise prediction, and speech filtration models) can be deployed to a client electronic device 101 for use. However, the method 1000 may be used with any other suitable device(s), such as the electronic device 101, and in any other suitable system(s).

As noted above, given that the denoising systems of this disclosure can be constrained to a fewer number of parameters compared to existing deep learning models, it can be advantageous in some cases for each model of the system to be trained with inputs that most closely resemble ground truths in order to teach the models what speech and noise look like. To achieve this, the method 1000 divides training into multiple stages to progressively train the machine learning models. At block 1002, the processor begins a first training stage in which a speech mask prediction model (such as the speech model 502 in FIG. 5) and a noise mask prediction model (such as the noise model 504 in FIG. 5) are trained to predict the speech and noise masks, respectively. This can be done without performing training of a filtering mask prediction model (such as the filtration model 506 in FIG. 5). As part of block 1002, the processor can access one or more training samples that include one or more of (i) noisy speech signals, (ii) clean speech signals, and (iii) noise signals. Each training sample is associated with a ground truth speech mask and/or a ground truth noise mask.

At block 1004, the processor inputs the one or more training samples to the speech mask prediction model and the noise mask prediction model and receives output speech and noise masks, respectively, from the models. During the first stage training, the processor updates the speech mask prediction model and the noise mask prediction model at blocks 1006 and 1008, respectively, such as by using a loss function to reduce or minimize a difference or loss between an output speech mask ($M_S$) and the ground truth speech mask and to reduce or minimize a difference or loss between an output noise mask ($M_V$) and the ground truth noise mask. In some cases, this can be expressed as a minimization of $\mathcal{L}(\hat{M}_S, M_S) + \mathcal{L}(\hat{M}_V, M_V)$. For example, when the outputs of the speech mask prediction model and/or the noise mask prediction model differ from the ground truths, the differences can be used to calculate a loss as defined by the loss function. The loss function may use any suitable measure of loss associated with outputs generated by the speech mask prediction model and the noise mask prediction model, such as a cross-entropy loss or a mean-squared error.

At decision block 1010, the processor determines whether the first stage training is complete. If not, the method 1000 loops back to block 1002. For example, multiple training iterations can be performed during the first stage training until a determination is reached that the first stage training of the speech mask prediction model and the noise mask prediction model is complete, such as upon a determination that the models are providing predictions at an acceptable accuracy level. When the loss calculated by the loss function is larger than desired, the parameters of the models can be adjusted. Once adjusted, the same or additional training data can be provided to the adjusted models, and additional outputs from the models can be compared to the ground truths so that additional losses can be determined using the loss function. At some point, at decision block 1010, the processor determines that the measured loss drops below a specified threshold, and the first stage training can be completed. The first training stage allows the speech mask prediction model and the noise mask prediction model to learn to predict their associated masks with accuracy prior to training the filtering mask prediction model.

Following the first training stage, as shown in FIG. 10B, the final phases of the system are trained during a second training stage. At block 1012, the processor accesses one or more training samples associated with a ground truth filtering mask. At block 1014, the processor inputs the one or more training samples to the speech mask prediction model and the noise mask prediction model and receives an output speech mask and an output noise mask. At block 1016, the processor uses the predicted speech and noise masks to input predicted speech and noise features to the filtering mask prediction model. At block 1018, the processor jointly trains the speech mask prediction model, the noise mask prediction model, and the filtering mask prediction model to predict a filtering mask (W) using the one or more training samples associated with ground truth filtering masks. The speech model 502, the noise model 504, and the filtering model 506 are updated, such as by using a loss function, during the second stage training to reduce or minimize a difference between the predicted filtering mask and the ground truth filtering mask. In some cases, this can be expressed as a minimization of $\mathcal{L}(\hat{W}, W)$. The processor uses the loss function to calculate the error or loss associated with the predictions of the ultimate filtering mask output by the denoising system. For example, when the filtering mask output by the filtering mask prediction model is received, the differences between the filtering mask and the ground truth can be used to calculate a loss as defined by the loss function. The loss function may use any suitable measure of loss associated with filtering mask outputs, such as a cross-entropy loss or a mean-squared error.

At decision block 1020, the processor determines whether the second stage training is complete. If not, the method 1000 loops back to block 1012. For example, multiple training iterations can be performed during the second stage training until a determination is reached that the second stage joint training of the speech mask prediction model, the noise mask prediction model, and the filtering mask prediction model is complete, such as upon a determination that the models are providing filtering mask predictions at an acceptable accuracy level. When the loss calculated by the loss function is larger than desired, the parameters of one or more of the models can be adjusted. Once adjusted, the same or additional training data can be provided to the adjusted models, and additional filtering mask outputs can be compared to the ground truths so that additional losses can be determined using the loss function. At some point, at decision block 1020, the processor determines that the measured loss drops below a specified threshold, and the second stage training can be completed. As such, the method 1000 involves progressively training the system starting from the initial models and then moving downstream. Since the initial speech mask prediction model and the noise mask prediction model are already trained, the audio inputs to the downstream models closely resemble the ground truths, greatly improving learning and accuracy of the entire denoising system. At block 1022, the trained denoising model can be deployed, such as to an electronic device 101.

Although FIGS. 10A and 10B illustrate one example of a method 1000 for two-stage denoising model training, various changes may be made to FIGS. 10A and 10B. For example, while shown as a series of steps, various steps in FIGS. 10A and 10B could overlap, occur in parallel, occur in a different order, or occur any number of times.

Figure 11:
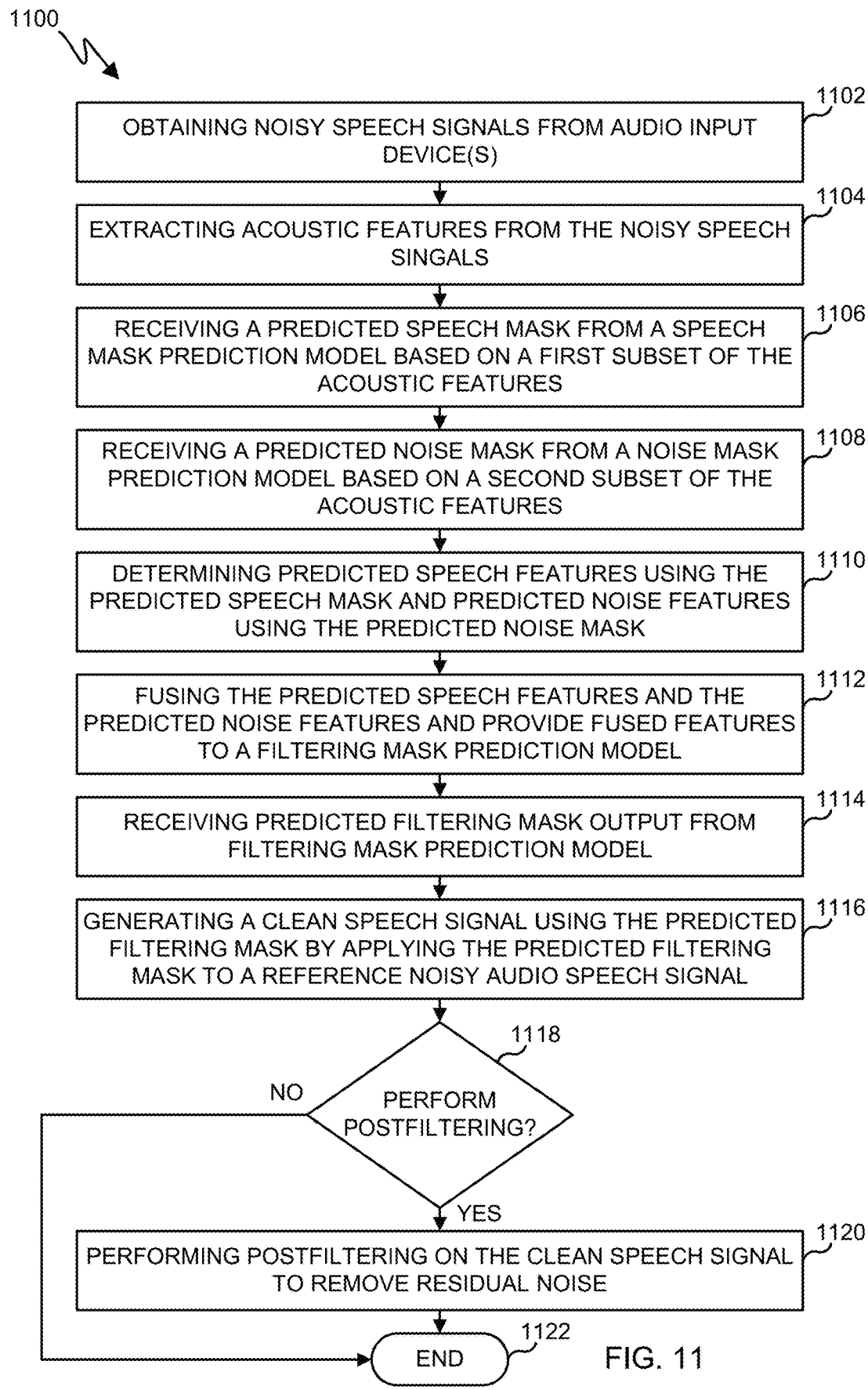
FIG. 11 illustrates an example method for audio signal denoising in accordance with embodiments of this disclosure.

FIG. 11 illustrates an example method 1100 for audio signal denoising in accordance with embodiments of this disclosure. For ease of explanation, the method 1100 shown in FIG. 11 is described as being performed using the electronic device 101 in the network configuration 100 of FIG. 1. However, the method 1100 could be performed using any other suitable device(s), such as the server 106, and in any other suitable system(s).

At block 1102, the processor obtains noisy speech signals from one or more audio input devices. At block 1104, the processor extracts acoustic features from the noisy speech signals. The processor provides the extracted acoustic features to a speech mask prediction model (such as the speech prediction model 402) and a noise mask prediction model (such as the noise prediction model 404). As described in this disclosure, the speech mask prediction model and the noise mask prediction model are trained to process acoustic features and estimate speech and noise intermediate variables to improve final audio quality. For example, the speech prediction model can be trained to estimate a speech mask ($M_S$) and the noise prediction model can be trained to estimate a noise mask ($M_V$) from the acoustic features of the audio inputs. These estimated speech and noise masks can reflect the SNR for each frequency bin (the intervals between samples in the frequency domain).

At block 1106, the processor receives a predicted speech mask from the speech mask prediction model based on a first subset of the acoustic features. At block 1108, the processor receives a predicted noise mask from a noise mask prediction model based on a second subset of the acoustic features. As described above, in some embodiments, the method 1100 uses the speech mask prediction model and the noise mask prediction model to model both speech and noise separately by leveraging two subsets of audio devices, such as microphones. Thus, the method 1100 can leverage multi-channel/multi-microphone raw data inputs and can make use of the two-branch speech and noise model architecture described above to apply separate subsets of microphone data to the speech prediction model and the noise prediction model. In other embodiments, however, a single microphone can be used.

At block 1110, the processor determines predicted speech features using the predicted speech mask and predicted noise features using the predicted noise mask. For example, in various embodiments, the predicted speech mask is used to extract speech magnitude distribution information from a reference audio signal, and the predicted noise mask is used to extract noise magnitude distribution information from another reference audio signal. For instance, after the speech mask ($M_S$) and noise mask ($M_V$) are determined from the acoustic feature subsets, the estimated speech mask ($M_S$) can be combined (such as multiplied) with a first reference audio signal, and the estimated noise mask ($M_V$) can be combined (such as multiplied) with a second reference audio signal to determine the predicted speech and noise features. In various embodiments, at block 1112, the processor fuses the predicted speech features and the predicted noise features and provides the fused features to a filtering mask prediction model. By filtering the speech and noise from some reference audio in a subset, the speech and noise information can be fused together for further processing by the speech filtration model. In some embodiments, fusing the speech and noise features can involve concatenation of the information or could use other information fusion techniques, such as partial processing and layer wise multiplication.

At block 1114, the processor receives a predicted filtering mask output by the filtering mask prediction model. For example, the speech filtration model can receive the fused speech and noise features and output a filtering mask (W). The filtering mask (W) can be SNR-dependent and can be estimated using an estimated SNR for each frequency component based on the speech and noise features. In this way, instead of directly learning clean speech as a target, the speech and noise features for each frequency bin can be estimated as learnable intermediate parameters to construct the SNR-dependent filtering mask. Utilizing the predicted speech and noise component improves the estimation of the final SNR-dependent filtering mask (W). At block 1116, the processor generates a clean/denoised speech signal using the predicted filtering mask, such as by applying (via multiplying or other technique) the predicted filtering mask to another reference noisy speech signal received using the audio input devices.

At decision block 1118, the processor determines whether to perform postfiltering on the clean speech signal. If not, the method 1100 ends at block 1122. If so, at block 1120, the processor performs postfiltering on the clean speech signal to remove residual noise from the clean speech signal, such as described above with respect to FIG. 7. The method 1100 then ends at block 1122. The denoised/clean audio signal can be used for performing at least one more-accurate speech recognition process, such as wake word detection and wake up processes and/or ASR/NLU processes. In various embodiments, the mask estimations performed by the method 1100 provide for smaller machine learning models, which allows for deployment on devices with lower memory and lower computational resources while still achieving improved accuracy over existing models.

Although FIG. 11 illustrates one example of a method 1100 for audio signal denoising, various changes may be made to FIG. 11. For example, while shown as a series of steps, various steps in FIG. 11 could overlap, occur in parallel, occur in a different order, or occur any number of times. Also, the method 1100 may be performed using a distributed architecture. For instance, the speech prediction model, the noise prediction model, and the speech filtration model could be executed on a client electronic device (such as electronic device 101) or at a server (such as server 106). When executed by the server, the server may provide the client electronic device with the determined action(s) to be performed by the client electronic device. In some embodiments, the client electronic device can provide audio data received via an audio input device of the client electronic device to the server, audio denoising can be performed by the server using the speech prediction model, the noise prediction model, and the speech filtration model, and one or more ASR/NLU models can be executed by either the client electronic device or the server based on the denoised audio data.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
obtaining, using at least one processing device of an electronic device, noisy speech signals;
extracting, using the at least one processing device, acoustic features from the noisy speech signals;
receiving, using the at least one processing device, a predicted speech mask from a speech mask prediction model based on a first subset of the acoustic features;
receiving, using the at least one processing device, a predicted noise mask from a noise mask prediction model based on a second subset of the acoustic features;
providing, using the at least one processing device, predicted speech features determined using the predicted speech mask and predicted noise features determined using the predicted noise mask to a filtering mask prediction model; and
generating, using the at least one processing device, a clean speech signal using a predicted filtering mask output by the filtering mask prediction model.

2. The method of claim 1, wherein generating the clean speech signal comprises applying the predicted filtering mask to a reference noisy speech signal.

3. The method of claim 1, wherein providing the predicted speech features and the predicted noise features to the filtering mask prediction model comprises fusing the predicted speech features and the predicted noise features.

4. The method of claim 1, further comprising:
collecting, using the at least one processing device, the first subset of the acoustic features using a first set of microphones and the second subset of the acoustic features using a second set of microphones.

5. The method of claim 1, further comprising:
training, using the at least one processing device, the speech mask prediction model and the noise mask prediction model in a first training stage, wherein the training the speech mask prediction model and the noise mask prediction model comprises:
accessing one or more training samples comprising one or more of (i) noisy speech signals, (ii) clean speech signals, and (iii) noise signals, wherein the one or more training samples is associated with a ground truth speech mask and a ground truth noise mask;
updating the speech mask prediction model to reduce a difference between an output speech mask and the ground truth speech mask; and
updating the noise mask prediction model to reduce a difference between an output noise mask and the ground truth noise mask.

6. The method of claim 5, further comprising:
training, using the at least one processing device, the speech mask prediction model, the noise mask prediction model, and the filtering mask prediction model in a second training stage after the first training stage, wherein training the speech mask prediction model, the noise mask prediction model, and the filtering mask prediction model comprises:
accessing the one or more training samples, wherein the one or more training samples is further associated with a ground truth filtering mask; and
updating the speech mask prediction model, the noise mask prediction model, and the filtering mask prediction model to reduce a difference between the predicted filtering mask and the ground truth filtering mask.

7. The method of claim 1, wherein:
the predicted speech mask is used to extract speech magnitude distribution information; and
the predicted noise mask is used to extract noise magnitude distribution information.

8. The method of claim 1, further comprising:
performing postfiltering on the clean speech signal to remove residual noise from the clean speech signal.

9. An apparatus comprising:
at least one processing device configured to:
obtain noisy speech signals;
extract acoustic features from the noisy speech signals;
receive a predicted speech mask from a speech mask prediction model based on a first subset of the acoustic features;
receive a predicted noise mask from a noise mask prediction model based on a second subset of the acoustic features;
provide predicted speech features determined using the predicted speech mask and predicted noise features determined using the predicted noise mask to a filtering mask prediction model; and
generate a clean speech signal using a predicted filtering mask output by the filtering mask prediction model.

10. The apparatus of claim 9, wherein, to generate the clean speech signal, the at least one processing device is configured to apply the predicted filtering mask to a reference noisy speech signal.

11. The apparatus of claim 9, wherein, to provide the predicted speech features and the predicted noise features to the filtering mask prediction model, the at least one processing device is configured to fuse the predicted speech features and the predicted noise features.

12. The apparatus of claim 9, wherein the at least one processing device is further configured to collect the first subset of the acoustic features using a first set of microphones and the second subset of the acoustic features using a second set of microphones.

13. The apparatus of claim 9, wherein:
the at least one processing device is further configured to train the speech mask prediction model and the noise mask prediction model in a first training stage; and
to train the speech mask prediction model and the noise mask prediction model, the at least one processing device is configured to:
access one or more training samples comprising one or more of (i) noisy speech signals, (ii) clean speech signals, and (iii) noise signals, wherein the one or more training samples is associated with a ground truth speech mask and a ground truth noise mask;
update the speech mask prediction model to reduce a difference between an output speech mask and the ground truth speech mask; and
update the noise mask prediction model to reduce a difference between an output noise mask and the ground truth noise mask.

14. The apparatus of claim 13, wherein:
the at least one processing device is further configured to train the speech mask prediction model, the noise mask prediction model, and the filtering mask prediction model in a second training stage after the first training stage; and
to train the speech mask prediction model, the noise mask prediction model, and the filtering mask prediction model, the at least one processing device is configured to:
access the one or more training samples, wherein the one or more training samples is further associated with a ground truth filtering mask; and
update the speech mask prediction model, the noise mask prediction model, and the filtering mask prediction model to reduce a difference between the predicted filtering mask and the ground truth filtering mask.

15. The apparatus of claim 9, wherein the at least one processing device is configured to:
use the predicted speech mask to extract speech magnitude distribution information; and
use the predicted noise mask to extract noise magnitude distribution information.

16. The apparatus of claim 9, wherein the at least one processing device is further configured to perform postfiltering on the clean speech signal to remove residual noise from the clean speech signal.

17. A non-transitory computer readable medium containing instructions that when executed cause at least one processor to:
obtain noisy speech signals;
extract acoustic features from the noisy speech signals;
receive a predicted speech mask from a speech mask prediction model based on a first subset of the acoustic features;
receive a predicted noise mask from a noise mask prediction model based on a second subset of the acoustic features;
provide predicted speech features determined using the predicted speech mask and predicted noise features determined using the predicted noise mask to a filtering mask prediction model; and
generate a clean speech signal using a predicted filtering mask output by the filtering mask prediction model.

18. The non-transitory computer readable medium of claim 17, wherein the instructions that when executed cause the at least one processor to provide the predicted speech features and the predicted noise features to the filtering mask prediction model comprise:
instructions that when executed cause the at least one processor to fuse the predicted speech features and the predicted noise features.

19. The non-transitory computer readable medium of claim 17, further containing instructions that when executed cause the at least one processor to train the speech mask prediction model and the noise mask prediction model in a first training stage;
wherein the instructions that when executed cause the at least one processor to train the speech mask prediction model and the noise mask prediction model comprise instructions that when executed cause the at least one processor to:
access one or more training samples comprising one or more of (i) noisy speech signals, (ii) clean speech signals, and (iii) noise signals, wherein the one or more training samples is associated with a ground truth speech mask and a ground truth noise mask;
update the speech mask prediction model to reduce a difference between an output speech mask and the ground truth speech mask; and
update the noise mask prediction model to reduce a difference between an output noise mask and the ground truth noise mask.

20. The non-transitory computer readable medium of claim 19, further containing instructions that when executed cause the at least one processor to train the speech mask prediction model, the noise mask prediction model, and the filtering mask prediction model in a second training stage after the first training stage;
wherein the instructions that when executed cause the at least one processor to train the speech mask prediction model, the noise mask prediction model, and the filtering mask prediction model comprise instructions that when executed cause the at least one processor to:
access the one or more training samples, wherein the one or more training samples is further associated with a ground truth filtering mask; and
update the speech mask prediction model, the noise mask prediction model, and the filtering mask prediction model to reduce a difference between the predicted filtering mask and the ground truth filtering mask.

* * * * *